United States Patent
Skiba et al.

(10) Patent No.: US 9,020,135 B2
(45) Date of Patent: Apr. 28, 2015

(54) DIALOG COMPATABILITY

(71) Applicant: Avaya Inc., Basking Ridge, NJ (US)

(72) Inventors: David Skiba, Golden, CO (US); George W. Erhart, Loveland, CO (US); Lee Becker, Boulder, CO (US); Valentine C. Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/023,018

(22) Filed: Sep. 10, 2013

(65) Prior Publication Data

US 2014/0301540 A1     Oct. 9, 2014

Related U.S. Application Data

(60) Provisional application No. 61/809,737, filed on Apr. 8, 2013.

(51) Int. Cl.
| | |
|---|---|
| *H04M 3/00* | (2006.01) |
| *H04M 5/00* | (2006.01) |
| *H04M 3/51* | (2006.01) |
| *G06F 17/28* | (2006.01) |
| *G06Q 50/00* | (2012.01) |
| *G10L 15/18* | (2013.01) |
| *H04L 12/58* | (2006.01) |
| *G06F 17/27* | (2006.01) |

(52) U.S. Cl.
CPC ............ *H04M 3/5175* (2013.01); *G06F 17/28* (2013.01); *G06Q 50/01* (2013.01); *G10L 15/1822* (2013.01); *H04L 51/32* (2013.01); *G06F 17/27* (2013.01); *G10L 15/18* (2013.01)

(58) Field of Classification Search
CPC ............................. H04M 3/5175; H04M 3/51
USPC .................. 379/242, 265.01, 265.02, 265.03, 379/265.06, 265.07
See application file for complete search history.

(56) References Cited

U.S. PATENT DOCUMENTS

2005/0047394 A1 *  3/2005  Hodson et al. ................. 370/352

OTHER PUBLICATIONS

"Virtual Observations—The CSI Call Center Blog: Driving Collections Compliance with Call Insight Speech Analytics." http://call-center-stories.blogspot.com/2013/02/driving-collections-compliance-with.html utm_source=feedburner&utm_medium=feed&utm_campaign=Feed%3A+callcenterindustry+%28Virtual+Observations+-+The+CSI+Call+Center+Blog%29#.USZ0WUKJJbw. Feb. 7, 2013. 5 pgs.

* cited by examiner

*Primary Examiner* — Thjuan K Addy
(74) *Attorney, Agent, or Firm* — Sheridan Ross P.C.

(57) ABSTRACT

A contact center system can receive messages from consumers. The system can then interact with the consumer or customer using a dialog. Before conducting the session with the consumer, past interactions using the dialog are reviewed to determine words, phrases, and other information that caused the dialog to be successful. The information is stored as norms. Upon beginning a new interaction with the dialog, the norms and the past successful dialogs are retrieved and compared to the active dialog while the interaction is on-going. The comparison is then used to ensure that the present active dialog will lead to a successful outcome or to resolve any issued if the outcome is not likely to be successful.

20 Claims, 12 Drawing Sheets

DIALOG COMPATABILITY

RELATED APPLICATIONS

This application claims priority to U.S. Provisional Application 61/809,737, filed Apr. 8, 2013, entitled "SENTIMENT FOR USE IN CONNECTION WITH CONTACT CENTER COMMUNICATIONS," which is incorporated herein by reference for all that it teaches and for all purposes.

BACKGROUND

Communication with customers and the importance of addressing customer concerns continues to grow in importance. Customers expect businesses and organizations to provide specific and direct answers to their issues, inquiries, and comments. The range of possible questions and issues is endless, requiring a highly skilled agent on the company end to handle the interactions. Unfortunately, agents can veer from proscribed dialogs or conversations and can fail to deliver the appropriate feedback to customers. Furthermore, consistency of answers and information is problematic. Incorrect information, slow response, and confusing replies are all dangers to the company when supporting customer interaction.

In general, human beings lack the ability to evaluate outcomes with great precision. Memories can be subjective, weak, and unreliable. In a contact center where efficiency and directed outcome are of paramount importance, a contact center supervisor needs tools to observe, compare, and redirect and/or correct inappropriate agent behaviors. Rather than relying on subjectively collected and analyzed information and/or anecdotal observation or discussion, tools for dialog monitoring, analysis, and intervention are needed.

The company needs an efficient way to provide agents with proper, relevant, and informative suggestions and in some cases real time feedback as to their progress in resolving customer issues.

SUMMARY

It is with respect to the above issues and other problems that the embodiments presented herein were contemplated. Embodiments presented herein provide a method for analyzing an agent dialog in a contact center, the method comprising: receiving, by a processor, a contact from a consumer; starting an active dialog with the consumer; receiving one or more of norms for the active dialog or a successful past dialog associated with the active dialog; comparing the active dialog with one or more of the norms or the successful past dialog; based on the comparison, determining if the active dialog is deviating from a successful path; if the active dialog is not deviating from the successful path, continuing comparing the active dialog with one or more of the norms or the successful past dialog until the contact is terminated; if the active dialog is deviating from a successful path, determining a resolution; and enacting the resolution.

An aspect of the above method includes wherein the active dialog has two or more successful paths.

An aspect of the above method further comprises: receiving dialog choices from a supervisor; retrieving past dialogs associated with the choices; mapping dialogs for norms; establishing the norms for each dialog; providing the norms for analysis; and providing successful dialogs for analysis.

An aspect of the above method further comprises determining intent of the active dialog.

An aspect of the above method further comprises determining a resolution state associated with the active dialog.

An aspect of the above method further comprises quantifying the deviation from a successful path based on one or more of the comparison, the intent of the active dialog, or the resolution state.

An aspect of the above method includes wherein the resolution state is a probability that the active dialog will end in a successful conclusion.

An aspect of the above method includes wherein the comparison to the norms can include one or more of: determining if a time elapsed is within normal parameters; determining if a word used has been successful; determining if a phrase used has been successful; and determining if an order of steps in the active dialog has been successful.

An aspect of the above method further comprises one or more of: determining if a new dialog is required to address the contact; determining if a new sequence of steps is successful; and determining if a dialog variation is successful.

An aspect of the above method includes wherein the resolution is one or more of: a warning to an agent that the agent is no longer on a successful path; an adjustment to the active dialog to return the agent to a successful path; and an alert to a supervisor that the agent is no longer on a successful path.

A computer readable medium having stored thereon processor executable instructions that cause a computing system to execute a method for analyzing an agent dialog, the instructions comprising: instructions to receive dialog choices from a supervisor; instructions to retrieve past dialogs associated with the choices; instructions to map dialogs for norms; instructions to establish the norms for each dialog; instructions to provide the norms for analysis; instructions to provide successful dialogs for analysis; instructions to receive, by a processor, a contact from a consumer; instructions to start an active dialog with the consumer; instructions to receive one or more of norms for the active dialog or a successful past dialog associated with the active dialog; instructions to compare the active dialog with one or more of the norms or the successful past dialog; based on the comparison, instructions to determine if the active dialog is deviate from a successful path; if the active dialog is not deviating from the successful path, instructions to continue compare the active dialog with one or more of the norms or the successful past dialog until the contact is terminated; if the active dialog is deviate from a successful path, instructions to determine a resolution; and instructions to enact the resolution.

An aspect of the above computer readable medium includes wherein the active dialog has two or more successful paths.

An aspect of the above computer readable medium further comprises: instructions to determine intent of the active dialog; and instructions to determine a resolution state associated with the active dialog, wherein the resolution state is a probability that the active dialog will end in a successful conclusion.

An aspect of the above computer readable medium further comprises: instructions to quantify the deviation from a successful path based on one or more of the comparison, the intent of the active dialog, or the resolution state; and wherein the comparison to the norms can include one or more of: instructions to determine if a time elapsed is within normal parameters; instructions to determine if a word used has been successful; instructions to determine if a phrase used has been successful; and instructions to determine if an order of steps in the active dialog has been successful.

An aspect of the above computer readable medium further comprises one or more of: instructions to determine if a new dialog is required to address the contact; instructions to determine if a new sequence of steps is successful; instructions to determine if a dialog variation is successful; wherein the resolution is one or more of: a warning to an agent that the agent is no longer on a successful path; an adjustment to the active dialog to return the agent to a successful path; and an alert to a supervisor that the agent is no longer on a successful path.

A communication system comprising: a contact center server in communication with one or more agents, the contact center server operable to receive a consumer contact, from a customer, wherein the contact center server comprises a dialog system, the dialog system operable to analyze an active dialog associated with the consumer contact, wherein the dialog system compromises: an analysis tools component that is operable to receive and analyze the active dialog, wherein the analysis tools component compromises: a dialog analysis module operable to: receive dialog choices from a supervisor; retrieve past dialogs associated with the choices; map dialogs for norms; establish the norms for each dialog; provide the norms for analysis; provide successful dialogs for analysis; an agent dialog analysis engine in communication with the dialog analysis module, wherein the agent dialog analysis engine is operable to: receive, by a processor, a contact from a consumer; start an active dialog with the consumer; receive one or more of norms for the active dialog or a successful past dialog associated with the active dialog; compare the active dialog with one or more of the norms or the successful past dialog; based on the comparison, determine if the active dialog is deviate from a successful path; if the active dialog is not deviate from the successful path, continue compare the active dialog with one or more of the norms or the successful past dialog until the contact is terminated; if the active dialog is deviate from a successful path, provide the active dialog for resolution determination.

An aspect of the above communication system includes wherein the agent dialog analysis engine comprises: an answer analyzer operable to determine one or more of: if a time elapsed is within normal parameters; if a phrase used has been successful; if an order of steps in the active dialog has been successful; an entrainment analyzer operable to determine one or more of a word used in the active dialog has been successful or an intent of the active dialog; a resolution predictor operable to determine a resolution state associated with the active dialog, wherein the resolution state is a probability that the active dialog will end in a successful conclusion; a grading module operable to quantify the deviation from a successful path based on one or more of the comparison, the intent of the active dialog, or the resolution state; a response router operable to determine a resolution is required.

An aspect of the above communication system includes wherein the response router sends a signal to an agent dialog response engine to determine a resolution, wherein the agent dialog response engine comprises: a dialog readjustment module operable to: enforce an adjustment to the active dialog to return the agent to a successful path; a warning module operable to send a warning to an agent that the agent is no longer on a successful path; a new dialog module operable to one or more of: determine if a new dialog is required to address the contact; determine if a new sequence of steps is successful; determine if a dialog variation is successful; and a supervisor module operable to send an alert to a supervisor that the agent is no longer on a successful path.

An aspect of the above communication system includes wherein the answer analyzer is further operable to access a database including norms, the norms including one or more of: a time elapsed for at least a portion of past dialogs associated with the active dialog; a word used in a past successful dialog; and a phrased used in a past successful dialog.

An aspect of the above communication system includes wherein the active dialog has two or more successful paths.

In an implementation, agent behavior is subject to mathematical and algorithmic analysis. A review of dialogs can allow a supervisor to choose dialogs that have been handled successfully. A set of norms can be mapped, including the amount of time appropriate for a dialog, typical words and phrases appropriate for the dialog, and other measurable or repeatable parameters. An active agent dialog may then be compared to previous dialogs based on procedures, scripts, and word similarities. By reviewing and analyzing multiple successful dialogs, a supervisor can quantify what a good answer to the dialog might contain. Additional analysis items that that may help quantify dialog success may include determining intent and resolution state.

The system may also notify/alert the agent in real-time when he or she deviates from a successful dialog path. In addition, the system may be able to guide the agent back to a success path or bring in an expert who has previously used the successful dialog path. The analysis can include:

Use analysis of old dialogs to determine if the current answer is accurate or substantially similar;

Entrainment analysis (determine similarities between words);

Data comparison between different sources (look at current procedures and scripts, previous dialogs and outcomes, good or bad);

New dialog analysis to determine if new dialogs should be built with receipt of confirmation that goal is reached;

Agent performance analysis to determine if the agent is performing the correct dialog or an incorrect dialog;

Analysis over multiple channels (voice, text, video);

Grading with different grades, scoring, thresholds, or weights to determine whether to deal with a problem automatically or with supervisor intervention.

There may be two or more types of contact center scenarios to which the dialog analysis may apply. For example, a first type of scenario may be for diagnostics (problems), and a second type of scenario may be for a purchase (want to buy). Generally, a scenario can include any situation where there are steps and an identifiable end state. Each scenario may lead down a different dialog path. The system can analyze past dialogs and scripts to determine if the current dialog is accurate and effective (i.e., making the agent more efficient). Also, the system can allow the supervisor and/or agent to learn, in real-time, what is successful in practice. The system may also correlate each side of a dialog to an amount of time the agent should be take to complete the portion of the dialog (i.e., ensure agents do not dwell on a particular topic). Finally, the system can search automatically for "dialog incompatibility" from determined norms.

As an example, a sample dialog might be for a cable provider that services home Internet access. The system can monitor the interactions over the communication media between a customer, with down Internet service, and a cable provider's agent. During the course of monitoring dialogs, the system can access an available pool of successful and unsuccessful dialogs. In this case, a dialog is successful when service is restored. When the system determines that a successful dialog consists of steps A, B, C, and D in that order, the system can monitor the active dialog for the order and similar content to past dialogs.

The typical steps for the dialog may be:
Step A: Check a browser with Internet access;
Step B: Check the power at the cable modem;

Step C: Check the cables at the cable modem;

Step D: Reset the cable modem.

If the agent attempts to tell a customer to try step D, without first doing A, B, and C, then the agent is not following a successful dialog interaction. When the agent asks the customer to perform Step D (out of sequence), the system may warn the agent and/or a supervisor. It should be noted that the agent may have already completed some steps of a successful dialog. The analysis may identify successful steps but determine that the current step is out-of-order and indicative of an unsuccessful dialog path.

An additional embodiment includes the ability of the system to learn sequential steps and acceptable variations on processes. This learning function can allow the system to grow as new and/or never before seen problems are resolved and as new techniques are developed. For example, an unusual situation for fixing a modem can include the occurrence of a lightning strike or a storm. The customer may state an external condition that might be the influencing factor in their issue, e.g., "My internet connection is poor after last night's storm. There was a lightning strike fairly close to my house." Once the issue is resolved, the influencing factor (i.e., the lightning/storm) might become a question that the agent might ask if the standard dialog is not reaching success.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects can be separately claimed.

The term "in communication with" as used herein refers to any coupling, connection, or interaction using electrical signals to exchange information or data, using any system, hardware, software, protocol, or format.

A user context, an extended user context, and/or a user social context as used herein means information about a user of a social media network that can be used to determine a "value" of that user.

The term "social media network" or "social media" is a service provider that builds online communities of people, who share interests and/or activities, or who are interested in exploring the interests and activities of others. Generally, social media are web-based and provide a variety of ways for users to interact, such as e-mail and instant messaging services.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements of the embodiment without departing from the spirit and scope of the appended claims.

Figure 1A:
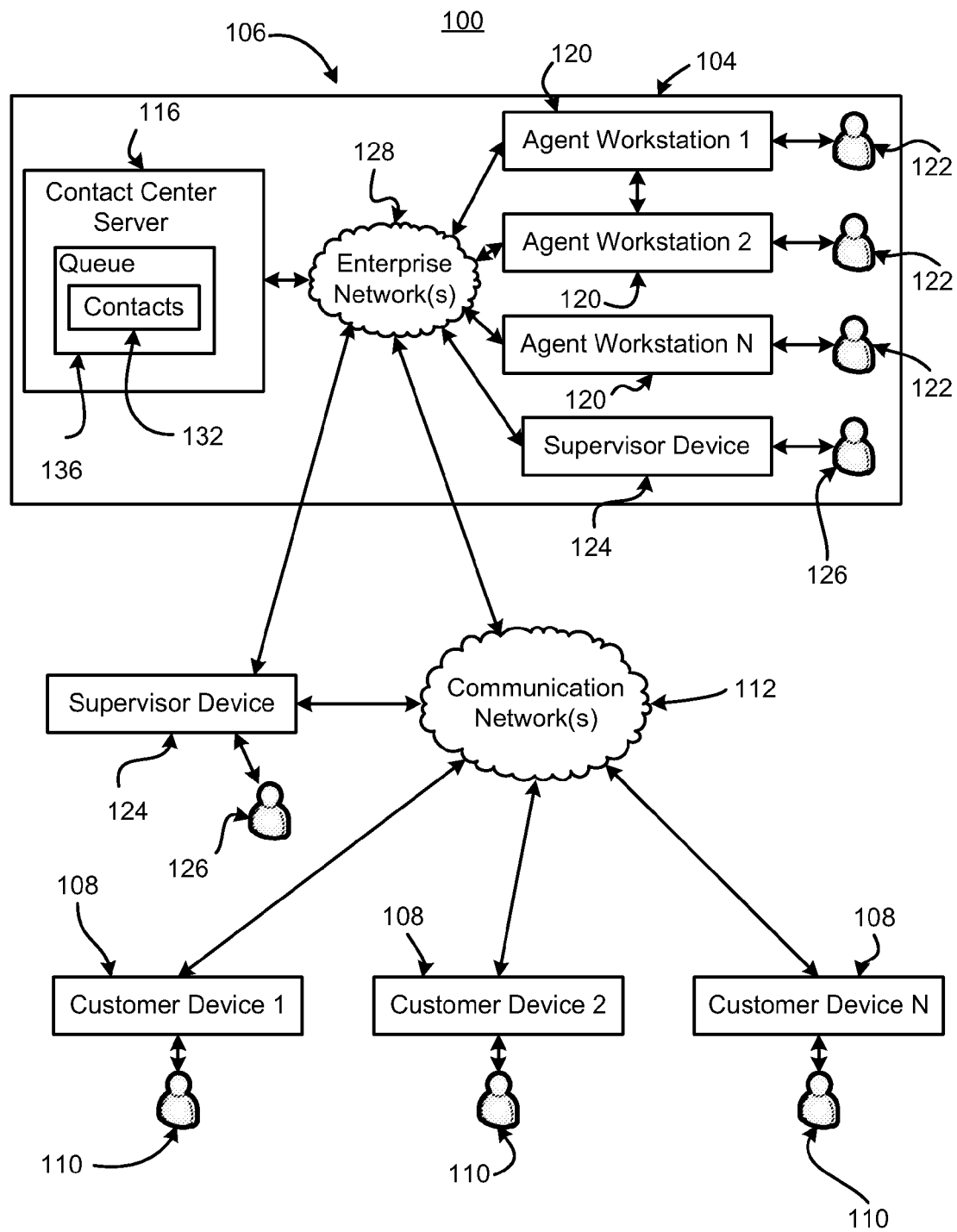
FIG. 1A is a block diagram of an embodiment of a communication system operable to interact with persons using different communication media.

A block diagram depicting components of a communication system 100 is shown in FIG. 1A. In particular, the communication system 100 can include a contact center 104. In general, the contact center 104 can be in communication with one or more customer endpoints or devices 108 via one or more communication networks 112. Examples of customer endpoints 108 can include one or more of, but are not limited to, smartphones, desktop computers, laptop computers, or any other device capable of supporting communications between a customer and a customer service or other agent associated with the contact center 104 using written, oral, and/or electronic communications. Accordingly, communications between the contact center 104 and the customer endpoints 108 can comprise email, instant messaging, a telephone call, short message system, or other real time or non-real time communications. The communication network 112 can include the Internet, a local area network (LAN), wide area network (WAN), public switched telephone network (PSTN), wireless networks, or a plurality of networks in any combination.

The contact center 104 generally includes a call or contact center server 116, such as an automatic contact (or call) distribution system (ACD) server 116. The ACD server 116 is illustratively the Communication Manager™ enterprise communication-based ACD system available from Avaya Inc. The ACD server is interconnected to a plurality of agent workstations or endpoints 120. For example, the agent workstations 120 may be connected to the ACD server 116 by an enterprise network or networks 128.

The contact center server 116 generally functions to connect agent workstations 120 to customer devices or endpoints 108 through the communication network 112, to allow the agents 122 to service customer 110 contacts 132. The contacts can comprise written, electronic communications. However, contacts are not necessarily limited to written communications. For example, the contact center 106 can additionally handle voice contacts. As can be appreciated by one of skill in the art after consideration of the present disclosure, the contact center server 116 can maintain one or more queues 136 for organizing and maintaining or holding contacts 132 waiting for handling by a contact center agent 122. For example, a plurality of queues 136 can be provided to sort contacts according to various parameters. Agents 122 associated with the agent workstations 120 are assigned to provide services to contacts 132 that have been placed within one or more of the queues 136 based on availability and/or weighting factors. Moreover, the workstations 120, which can comprise general purpose computers, thin client devices, or other devices, generally support the delivery of customer contacts to associated agents 122, and to receive replies to the customer contacts from the agents 122. In addition, the agent workstations 120 can include a user output in the form of a display that can present a determined sentiment or sentiment indicator for a contact, or aggregation of contacts, to associated agents 122.

In addition, system 100, as described herein, can include one or more supervisor or administrator devices 124. The supervisor device 124 is generally in communication with the contact center server 116 via the communication network 112 and/or the enterprise network 128. For example, if the supervisor device 124 is on the premises of the contact center 104, communications with the contact center server 116 may be over a portion of the enterprise network 128 comprising a wired or wireless network. As another example, the supervisor device 124 may be in communication with the contact center server 116 over the communication network 112, for example via a cellular telephony data network, a wired or wireless connection outside of the enterprise network 128, or the like. In general, the supervisor device 124 comprises functionality that allows a supervisor 126 to monitor the health of the contact center 104, and to control aspects of the operation of the contact center 104. Moreover, the supervisor device 124 can present a sentiment indicator for a contact or aggregation of contacts to a supervisor 126. Accordingly, the supervisor device 124 can comprise any device, including a mobile device, capable of presenting information to a supervisor 126. Accordingly, examples of a supervisor device 124 include, but are not limited to, a tablet computer, a smartphone, a laptop computer, a desktop computer, a netbook, or the like.

Figure 1B:
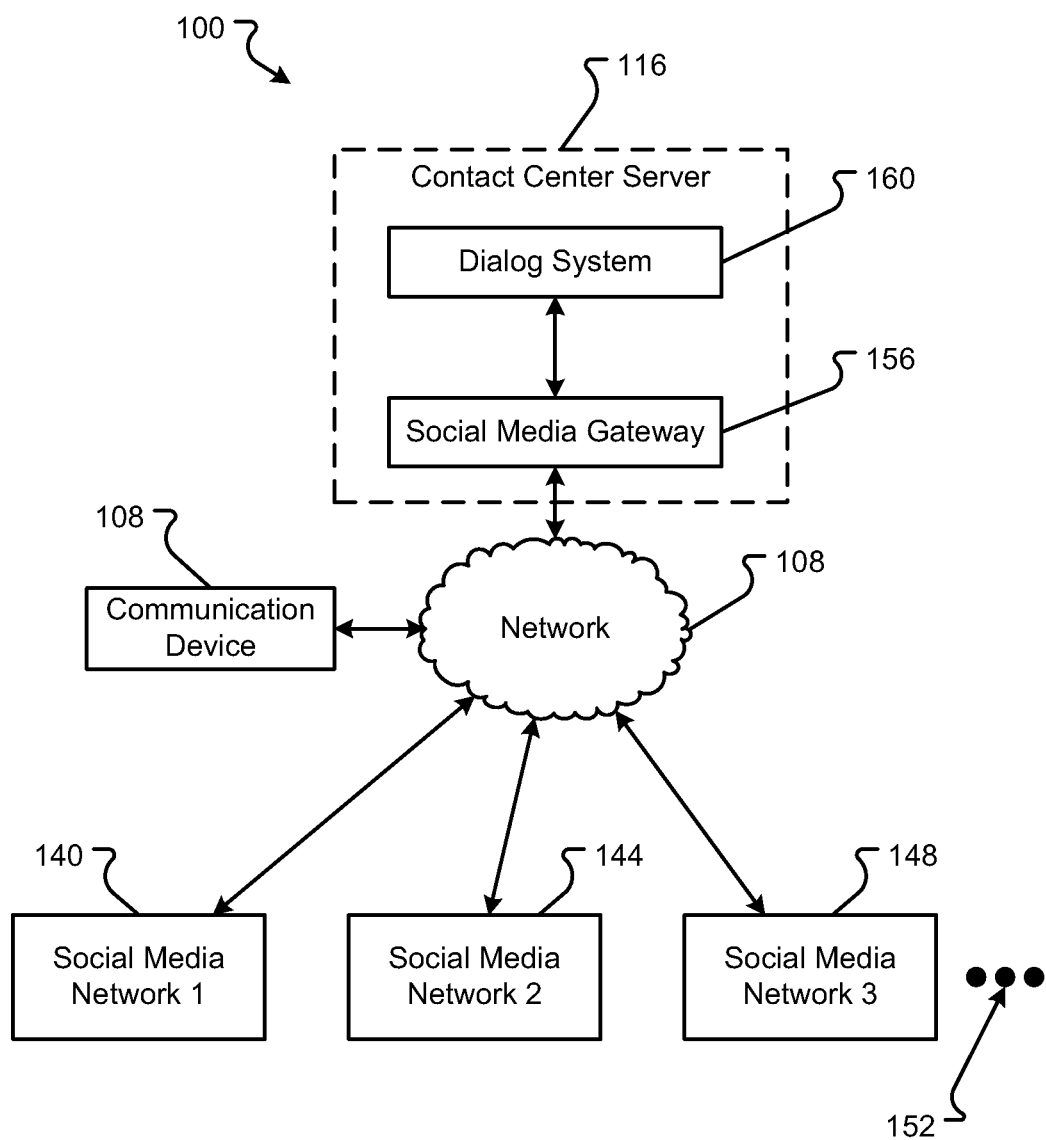
FIG. 1B is another block diagram of a further embodiment of a communication system operable to interact with persons using different communication media

A further embodiment of the communication system 100, for interacting with persons using social media, is shown in FIG. 1B. The communication system 100 can include a contact center 104, a network 128, 112, and one or more types of social media networks or systems, such as social media network 1 140, social media network 2 144, and/or social media network 3 148. Social media networks 140, 144, and/or 148 can be any social media including, but not limited to, networks, websites, or computer enabled systems. For example, a social media network may be MySpace™, Facebook™, Twitter™, Linked-In™, Spoke™, or other similar computer enabled systems or websites. The communication system 100 can communicate with more or fewer social media networks 140, 144, and/or 148 than those shown FIG. 1B, as represented by ellipses 152.

The network(s) 128, 112 can be any network, as described in conjunction with FIG. 1A, which allow communication between the contact center 116 and the one or more social media networks 140, 144, and/or 148. The network(s) 128, 112 can represent any communication system, whether wired or wireless, using any protocol and/or format. The network(s) 128, 112 provides communication capability for the contact center 116 to communicate with websites or systems corresponding to the one or more social media networks 140, 144, and/or 148. The network(s) 128, 112 may be as described in conjunction with FIGS. 5 and 6.

A contact center 116 can be a system that can communicate with one or more persons that use social media networking sites 112, 114, and/or 116. The contact center 116 can be hardware, software, or a combination of hardware and software. The contact center 116 can be executed by one or more servers or computer systems, as described in conjunction with FIGS. 5 and 6. The contact center 116 can include all systems, whether hardware or software, that allow the contact center 116 to receive, service, and respond to directed and non-directed contacts. For example, the contact center 116 can include the telephone or email system, an interface to human agents, systems to allow human agents to service and respond to received contacts, and one or more systems operable to analyze and improve the function of agent interaction.

The contact center 116 may include a dialog system 160 and a social media gateway 156. While the dialog system 160 and the social media gateway 156 are shown as being a part of the contact center system 116, in other situations, the dialog system 160 and/or the social media gateway 156 are separate systems or functions executed separately from the contact center 116 and/or executed by a third party. The dialog system 160 may process and receive messages. The social media gateway 156 can receive and translate messages from the one or more social media networks 140, 144, and/or 148. An embodiment of the dialog system 160 is described in conjunction with FIG. 2B. An embodiment of the social media gateway 156 is described in conjunction with FIG. 2A.

The contact center 116 may also communicate with one or more communication devices 108. The communication devices 108 can represent a customer's or user's cell phone, email system, personal digital assistant, laptop computer, or other device that allows the contact center 116 to interact with the customer. The contact center 116 can modify a non-direct contact, from a social media network 140, 144, and/or 148, into a directed contact by sending a response message directly to a customer's communication device 108.

Figure 2A:
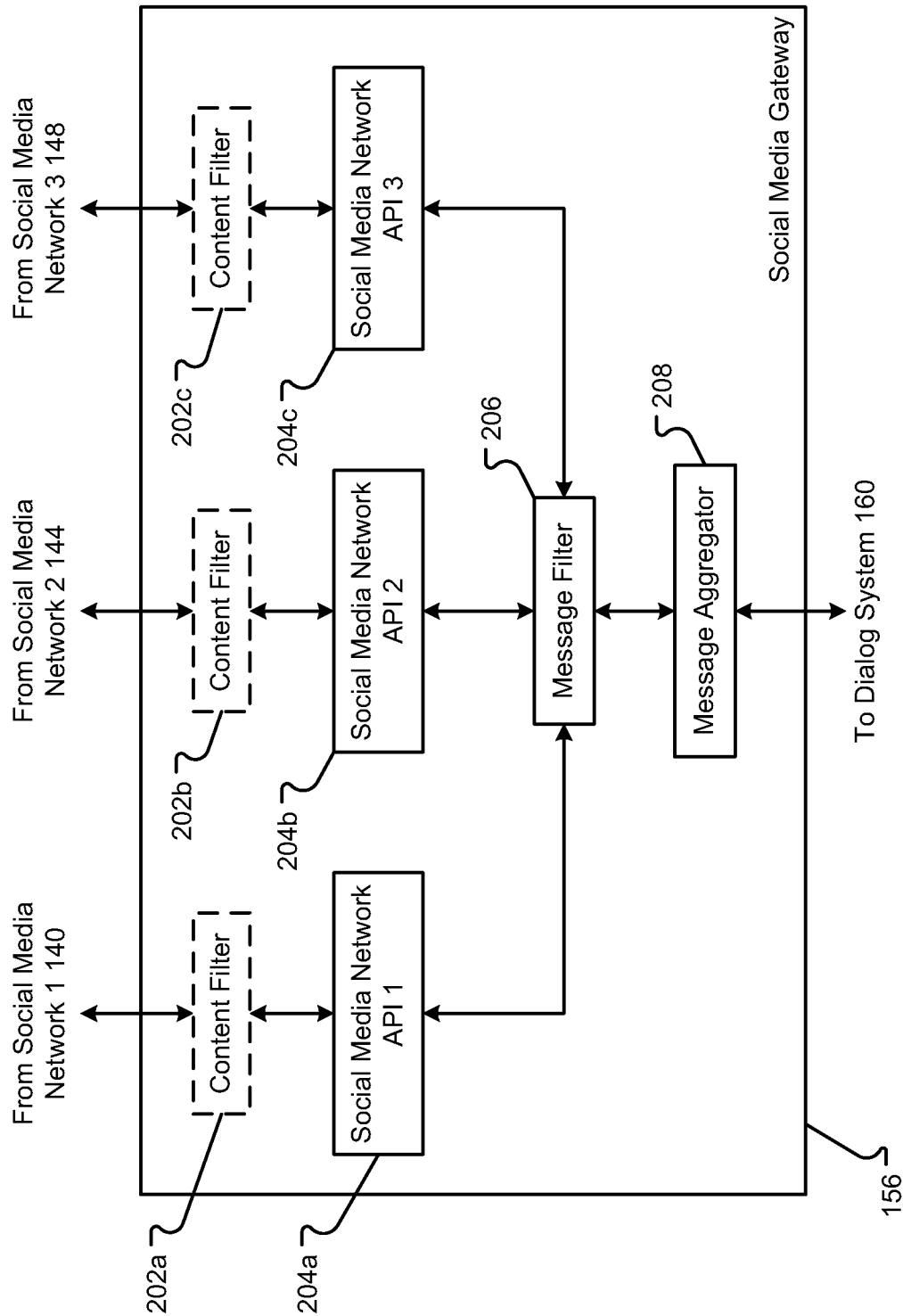
FIG. 2A is a block diagram of an embodiment of a social media gateway.

An embodiment of the social media gateway 156 is shown in FIG. 2A. The social media gateway 156 can include one or more components which may include hardware, software, or combination of hardware and software. The social media gateway 156 can be executed by a computer system, such as those described in conjunction with FIGS. 5 and 6. However, in other embodiments, the components described in conjunction with FIG. 2A are logic circuits or other specially-designed hardware that are embodied in a field programmable gate array (FPGA) application specific integrated circuit (ASIC), or other hardware.

Herein, the social media gateway 156 can include one or more content filters 202a, 202b, and/or 202c. A content filter 202 can receive all of the messages for the contact center 116 from a social media network 140, 144, and/or 148 and eliminate or delete those messages that do not require a response. For example, a message between two friends on a Facebook™ page, if not pertaining to a product or a service of the company operating the contact center 116, may not need a response. As such, the content filter 202 can filter out or delete the non-suitable message from the messages that are received by the social media network application programming interface (API) 1 204a, social media network API 2 204b, and/or social media network API 3 204c. With the content filter 202, the social media network API 204 only needs to translate those messages that should be received by the dialog system 160. Translation typically requires the conversion of the message into a different format.

The content filter 202 is provided with one or more heuristics or filter rules from a filter database (not shown). These filter rules can be created by the external customer or internal user (e.g. agent or administrator) of the communication system 100. Thus, the user or customer of the communication system 100 can customize the filtering of messages from social media networks 140, 144, and/or 148. Further, different rules may be applied to different social media networks 140, 144, and/or 148, as some social media networks 140, 144, and/or 148 may have different types of messages or postings than other types of social media networks 140, 144, and/or 148. While the content filter 202 is shown as part of the social media gateway 156, it is to be appreciated that the content filter 202 may be a part of the social media network API 204. The content filter 202 may correspond to query terms used by the social media network API 204. The content filter 202 or query terms are an argument to the social media network API 204 call.

The social media network API 204 can be an application, which may be provided by the social media network 140, 144, and/or 148, to access the social media network(s) 140, 144, and/or 148. Thus, the social media network API 204 is called and connects the social media gateway 156 to the social media network 140, 144, and/or 148. Any suitable filter criteria may be employed for social media API 204. Examples of filter criteria include positive content of the source of a posting, an address field, a destination or recipient address fields, a time stamp field, a subject matter field, and/or a message body field. For example, a type of searchable content can be the name of the business enterprise running or employing the contact center 116 and/or the products or services of the enterprise.

The social media gateway 156 can include one or more social media network APIs 204. As shown in FIG. 2A, the social media gateway 156 may include a social media network API 204 for each social media network 140, 144, and/or 148. As such, the social media gateway 156 can interact with each social media network 140, 144, and/or 148 in the particular (often unique) format or protocol used by the social media network 140, 144, and/or 148. Further, when new social media networks are created, the social media gateway 156 can be easily expanded to interact with those social media networks by adding another social media network API 204. Where social media networks 140, 144, and/or 148 are more standardized, or use substantially similar formats or protocols, a single social media network API 204 can be shared by multiple social media networks 140, 144, and/or 148.

The social media network API 204 can receive messages from and send messages to the social media network 140, 144, and/or 148. The social media network API 204 can translate a message received from a social media network 140, 144, and/or 148 and send the translated message to a message filter 206. The social media network API 204 can translate the received message into a standard formatted file. For example, the translated message may be represented by an extensible mark-up language (XML) file or other file having a general format. As such, each specific and particular social media network message can be translated into a standard format for use by the dialog system 160. Further, the social media network API 204 can receive a generally or standard format response message, from the dialog system 160, and translate that response into a particularly or specifically formatted response message that can be posted to the corresponding social media network 140, 144, and/or 148.

Messages to the contact center 116 are addressed to the contact center 116. For example, a customer may become a "friend" of the contact center 116 on a social media network 140, 144, and/or 148, such as Facebook™. The customer may then address a message to the contact center 116 on Facebook™. This non-direct contact is a message that is not sent directly to the contact center 116 but to the contact center's Facebook™ page. In other circumstances, the contact center 116 receives messages not addressed to the contact center 116. For example, the contact center 116 can receive tweets from Twitter™ that are "broadcast" rather than addressed to the contact center 116. The contact center 116 may also search for messages or content on the social media networks 140, 144, and/or 148. Exemplary search criteria include customer name, customer profession, customer home address, customer business address, customer employer name, customer educational or professional background, customer hobby, personal or business interests, customer family profile, and the like. Thus, the social media gateway 156 of the contact center 116 can query, gather, or connect to a live feed of data from a social media network 140, 144, and/or 148 and then apply a filter to the indirect information.

Further, the social media network API 204 can also retrieve user context or other extended information from the social media networks 140, 144, and/or 148. User context or other extended information can include historical posts, historical tweets, or other historical communications that a user may have received or sent. Further, user context or other extended information can include, but is not limited to, account information for a user, the user's followers or friends, information on where historical messages were posted (e.g., geo-location, time/date, what type of device, etc.), trending analysis that the social media network 140, 144, and/or 148 might provide the user, etc. Thus, the social media network API 204 can retrieve information that is associated with a user and a social media network 140, 144, and/or 148 but not necessarily a part of a current message. The social media network API 204 is a gatherer of data, which can be used to determine a value for the user of the social media networks 140, 144, and/or 148.

The translated messages from the social media network API 204 can be received by a message filter 206. A message filter 206 can perform some or all of the functions of the content filter 202 and eliminate messages before being sent to the dialog system 160. However, in other situations, the message filter 206 eliminates information from within the messages before the redacted messages are sent to the dialog system 160. For example, a message from a social media network 140, 144, and/or 148 may have three or four interactions between two parties not associated with the contact center 116. Only one of the several postings may be pertinent to the dialog system 160. As such, the message filter 206 can eliminate or delete at least a portion of the other messages for the dialog system 160. Thus, the dialog system 160 receives a message where some of the content of the message has been deleted.

The message filter 206 can retrieve heuristics or filter rules from a filter database (not shown), similar to the content filter 202. A substantial difference between the content and message filters 202 and 206 is that the content filter 202 is specific to a particular message format associated with a corresponding social media network 140, 144, and/or 148, while the message filter 206 is applied to a standardized or universal format and is therefore common to multiple social media networks 140, 144, and/or 148. One skilled in the art will understand the type of rules that may be used to filter information from messages such that only pertinent questions, facts, requests, or information is sent to the dialog system 160.

A message aggregator 208 may also be included with the social media gateway 156. A message aggregator 208 can, in contrast to the message filter 206, combine two or more messages into a packet or grouping that is sent to the dialog system 160. Therefore, the message aggregator 208 can interrelate or combine messages based on information within the messages. For example, two messages may be combined based on any of the message fields referenced above, such as the person that posted the message, the subject, the request or question asked, the person the message was sent to, or other information that may be pertinent to the dialog system 160. Thus, the dialog system 160 may be able to respond concurrently to two or more messages based on a grouping provided by the message aggregator 208. Regardless of whether the messages are aggregated, each message or grouping of messages can be sent from the social media gateway 156 to the dialog system 160.

The social media gateway 156 can also send responses back to the social media networks 140, 144, and/or 148. A response from an agent in the contact center 116 can be sent to the social media gateway 156. The response may be received in a general format and then translated. The translated response may then be posted to the appropriate social media network 140, 144, and/or 148 by the social media gateway 156. In other embodiments, the agent may post the response directly to the social media network 140, 144, and/or 148 without sending the response to the social media gateway 156.

Figure 2B:
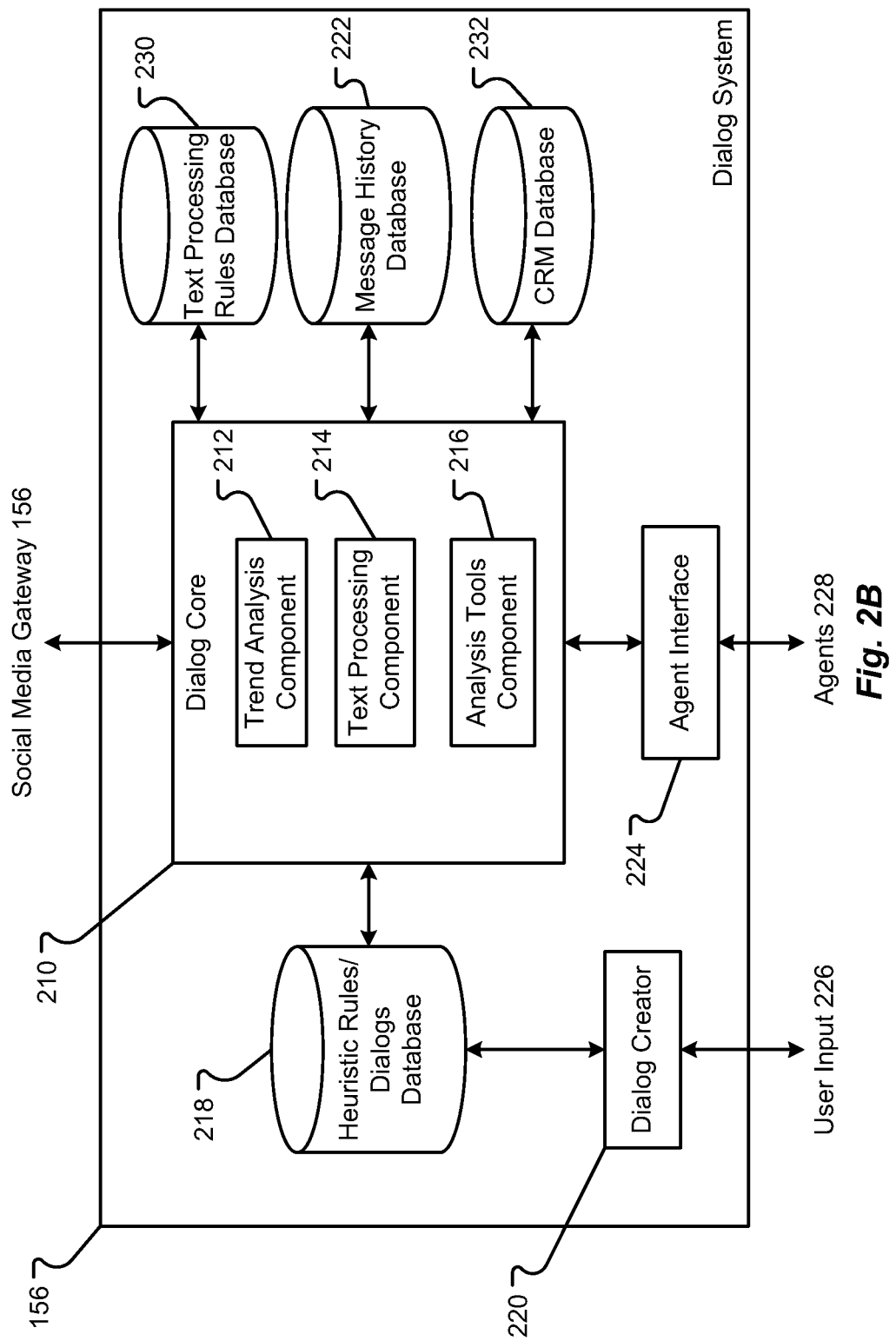
FIG. 2B is a block diagram of an embodiment of a dialog system.

An embodiment of the dialog system 160 is shown in FIG. 2B. The dialog system 160 can include one or more components which may be hardware, software, or a combination of hardware and software. The dialog system 160 can be executed by a computer system such as those described in conjunction with FIGS. 5 and 6. However, in other embodiments, the components described in conjunction with FIG. 2B, are logic circuits or other specially-designed hardware that are embodied in a FPGA or ASIC. The components contained within the dialog system 160 can include a dialog core 210 that is communication with a message history database 222, an agent interface 224, and a heuristic rules and dialogs database 218. Further, the heuristic rules and dialogs database 218 can be in communication with a dialog creator 220.

The dialog core 210 can include one or more sub-components. For example, the dialog core 210 can include a trend analysis component 212, a text processing component 214, and an analysis tools component 216. These components, similar to the components for the dialog system 160, can be hardware, software, or combination of hardware and software. The dialog core 210 may step through the states of a dialog data structure. A dialog data structure can include a set of inputs and associated actions that can be taken which allow for the automatic and structured response to social media requests or messages. For example, if a user asks for a manual, the input of the text word "manual" can cause the dialog system 160, in accordance with a dialog data structure, to send information about one or more manuals. In turn, the receiver of the response may respond, in kind, with the selection of a certain user manual. In which case, the dialog data structure may then instruct the dialog core 210 to send the user to a website where the user can retrieve an electronic version of the manual. As such, the dialog data structure provides a script a dialog that allows the dialog core 210 to automate the interaction between the contact center 116 and a person. This automation eliminates the need for agent involvement, in some situations, and makes the contact center 116 more efficient and more effective. Further, the automation expands the contact center's ability to answer numerous messages from the plethora of postings on the numerous social media networks 140, 144, and/or 148.

The dialog creator 220 can create a dialog data structure that includes instructions for various states for each social media message that comes into the contact center 116. The first instruction might be to send the social media message to the trend analysis component 212, then to the text processing component 214, and then execute a query of a Customer Relationship Management (CRM) database 232 (to determine if this user has an existing order). A CRM database 232 can be a database as described in conjunction with FIGS. 5 and 6 and can store information about customers or other data related to customer relations. Finally, the dialog data structure 220 may decide that the social media message should be sent to a human agent 228 for processing. The instructions or node transitions are executed in the dialog core 210 and make use of many different components that the dialog creator 220 combines in any way the user desires to handle the social media messages. The dialog core 210 can make use of the trend analysis component 212, text processing component 214, or other systems. The dialog core 210 may also interface with a CRM system and/or database 232, external databases, social media user information (e.g., followers, friends, post history, etc. from the social media site), or other systems.

The trend analysis component 212 is operable to analyze trends that occur between two or more messages received by the social media networks 140, 144, and/or 148. The two messages can be from different social media network 140, 144, and/or 148, so that the trend analysis component 212 can identify trends across several different social media networks 140, 144, and/or 148. Trends can include multiple occurrences of the same word or phrase, multiple occurrences of a customer identity, product name or service, or multiple occurrences of some other information that might indicate a trend. Further, the trend analysis component 212 may be able to identify escalations in the occurrences of particular text, identities, or other information, or may identify multiple occurrences over a period of time. The trend analysis component 212 may also be able to apply one or more different algorithms to occurrences of information within the social media networks 140, 144, and/or 148. For example, the trend analysis component 212 can match the number of occurrences of a phrase or word over a period of time and apply analysis to determine if the occurrences are increasing or decreasing over the period of time.

The text processing component 214 is operable to analyze text of one or more messages from social media networks 112, 114, or 116 or other contacts. Some possible methods for text processing can include Regular Expression, Latent Semantic Indexing (LSI), text part of speech tagging, text clustering, N-Gram document analysis, etc. In addition, for possibly longer documents, (such as, blogs or emails), the text processing component 214 may execute one or more methods of document summarization. The summarization may occur if the social media message will be sent to an agent 228 of the contact center 116; the summarization can reduce the amount of information that the agent 228 may manage. The text processing rules or models may be stored in and/or retrieved from a text processing rules database 230. The text processing rules database 230 can be a database as described in conjunction with FIGS. 5 and 6 that stores rules or models used by the text processing component 214.

The text processing component 214 can identify one or more occurrences of a particular text, such as using one or more of the message fields referenced above, in order to associate that social media message with one or more dialogs data structures in the heuristic rules and dialog database 218. For example, the text processing component 214 can look for the word "manual," in the social media message. If the word "manual" is found, the text processing component 214 may retrieve a dialog data structure from the heuristic rules and dialogs database 218 and, as the dialog data structure instructs, communicate with the customer about one or more owner's manuals, repair manuals, or other types of manuals. In another example, if the social media message includes the words, "buy", "sell", "price, "discount" or other types of words that may indicate the user or customer wishes to buy a product, the text processing component 214 can retrieve one or more dialog data structures from the heuristic rules and dialogs database 218 that can provide instruction to assist the customer in purchasing products or services from the enterprise.

The analysis tools component 216 is operable to analyze response messages received back from an agent interface 224. In analyzing the agent's responses, the analysis tools component 216 can determine if the dialog data structures originally retrieved by the text processing component 214 met the needs of the customer. In the analysis, the agent 228 may enter one or more items of information, for the analysis tools component 216, about the response and about how the response matched with the dialog data structures. The analysis tools component 216 can review the response and determine if it was similar to the response provided by the dialog data structure. Thus, the analysis tools component 216 can provide information to the dialog core 210 or the dialog creator 220 to improve the dialog data structures that are included in the heuristic rules and dialogs database 218.

Figure 5:
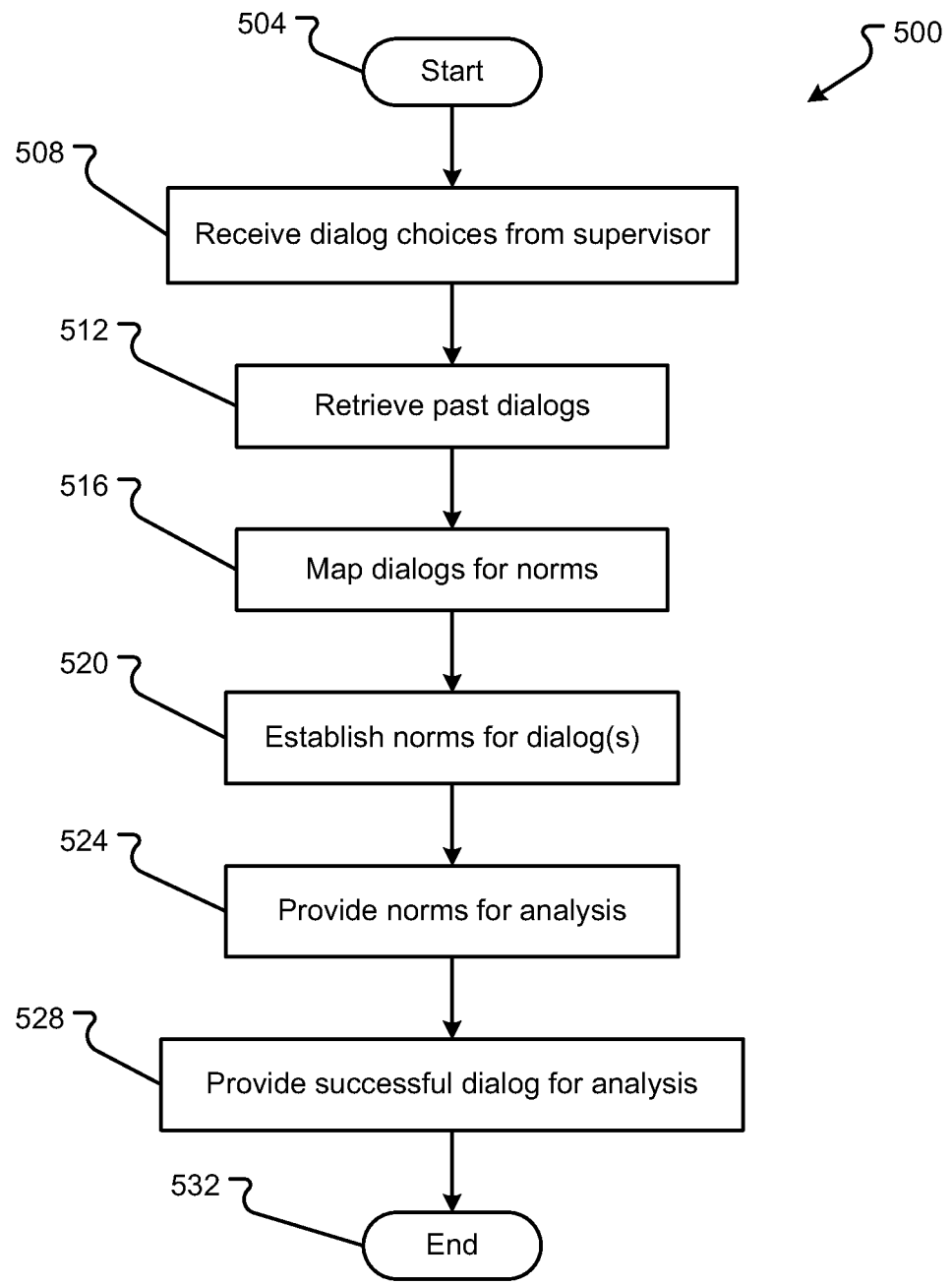
FIG. 5 is a flow/process diagram of an embodiment a method for establishing norms/successful (and unsuccessful) paths for an agent dialog.
Figure 6:
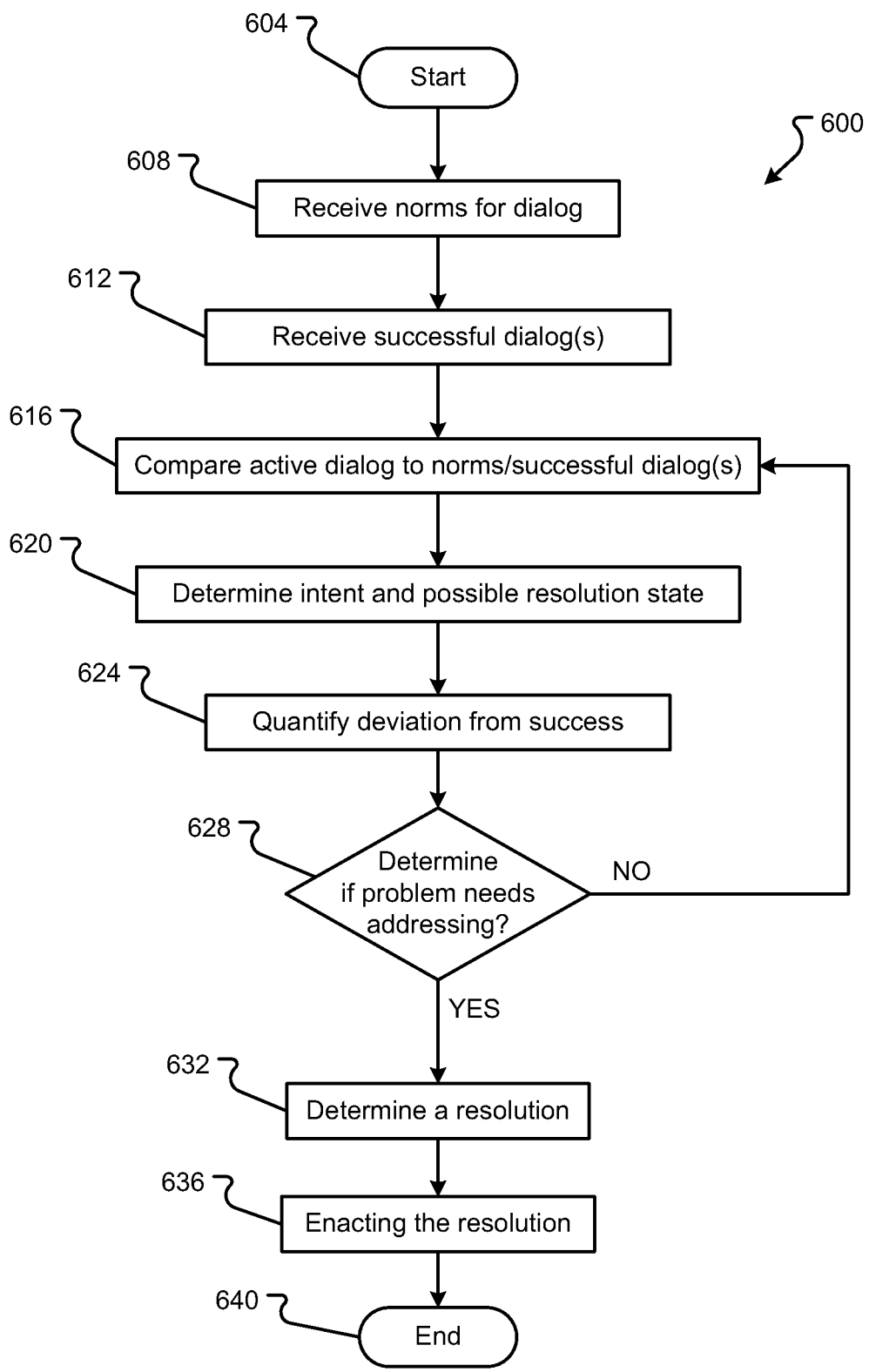
FIG. 6 is a flow/process diagram of an embodiment a method for analyzing an active dialog to determine the likelihood that the dialog will be successful.

The message history database 222 can be any database or data storage system as described in conjunction with FIGS. 5 and 6. Thus, the message history database 222 can store data in data fields, objects, or other data structures to allow other systems to retrieve that information at a later time. The message history database 222 can store previous messages or information about previous messages. Thus, for example, if the trend analysis component 212 is analyzing several messages over a period of time, the trend analysis component 212 can retrieve information about previous messages associated with the current analysis from the message history database 222. As such, the trend analysis component 212 can better detect trends occurring at the social media networks 140, 144, and/or 148. The data stored by the message history database 222 can include the entire message or only a portion of the message, and in some circumstances, include metadata about the message(s).

The heuristic rules and dialogs database 218 can be any type of database or data storage system as described in conjunction with FIGS. 5 and 6. The heuristic rules and dialogs database 218 can store information in data fields, data objects, and/or any other data structures. The heuristic rules and dialogs database 218 stores rules and dialogs data structures that automate responses to received social media messages. The dialogs data structures control the interaction between the dialog core 210 and the social media network 140, 144, and/or 148. The dialogs or heuristic rules can be created by a dialog creator 220. Thus, the dialog creator 220 can interface with user input 226 to receive information about dialogs. The user input 226 is then used to form the states and responses for a dialog data structure.

An agent interface 224 is a communication system operable to send action items to contact center agents 228, in the contact center 116. An agent can be a person or other system that is operable to respond to certain questions or requests from a customer. For example, the agent 228 can be a person that has specialized expertise in a topic area, such as technical support. The agent interface 224 can format the social message into an action item and forward that message to one or more agents 228. The agent interface 224 can also receive response(s) back from the agents 228. The information provided by the agent 228 may be used by the dialog core 210 to complete a response to the social media message or other contact. For example, the information may classify the social media message (e.g., sales, service, etc.). In other situations, the response is a complete response to the social media message that can be posted to the social media network 140, 144, and/or 148. It should be noted that the answer based agent routing described hereinafter may be implemented in other types of call center or customer service centers other than that previously described. Thus, the answer based agent routing systems and methods described hereinafter are not limited to the social media call center described above.

Figure 3A:
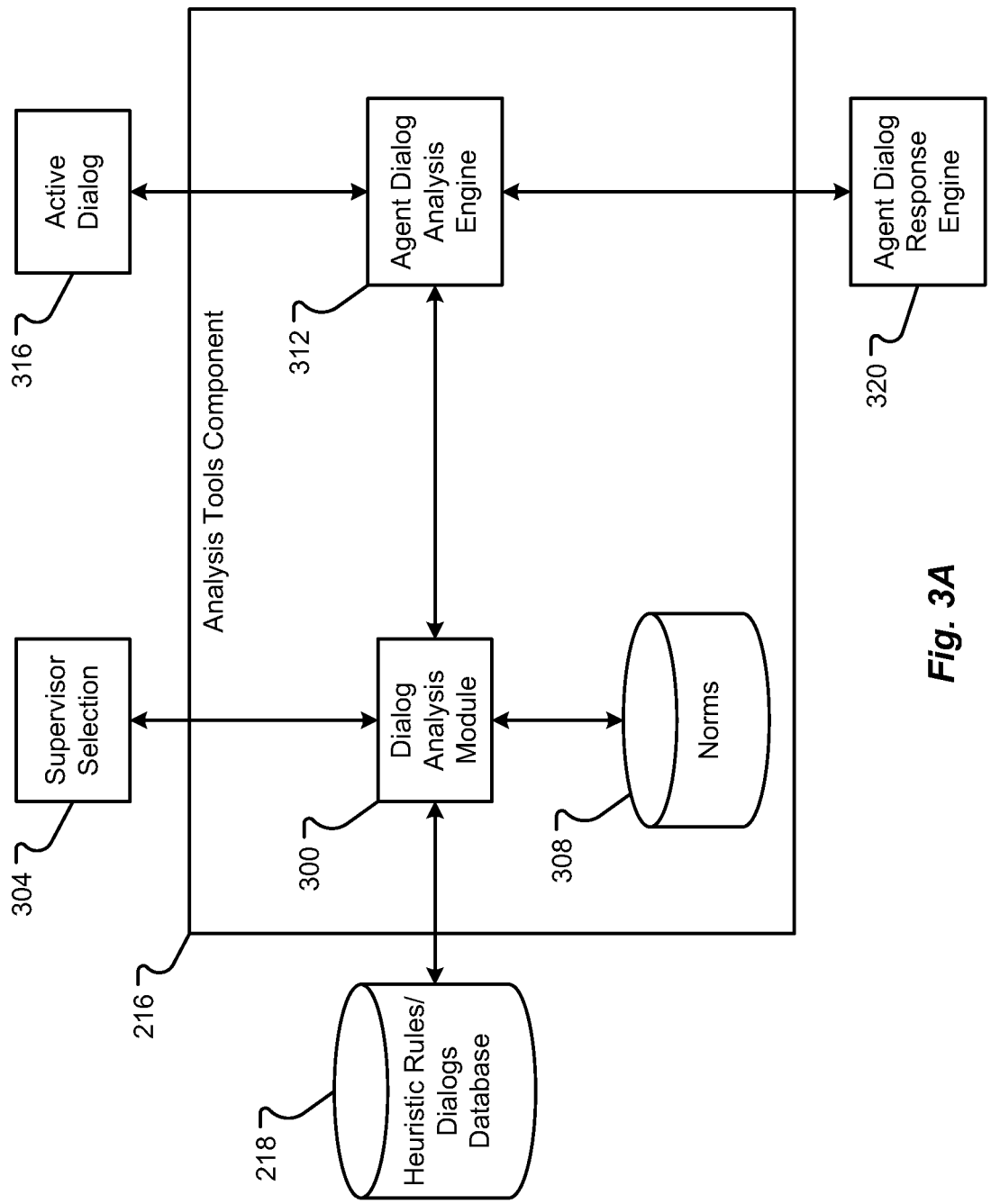
FIG. 3A is a block diagram of an embodiment of an analysis tools component.

An embodiment of an analysis tools component 216 is shown in FIG. 3A. The analysis tool component 216 can include one or more sub-modules or components, including one or more of, but not limited to, a dialog analysis module 300 and an agent dialog analysis engine 312. The sub-modules may be embodied in hardware, software, or hardware and software. The different sub-modules may have access to one or more databases, including a heuristic rules and dialogs database 218. Further, the sub-modules may receive input from supervisor selections 304 or from an active dialog 316. There may be outputs including a response to an agent dialog response engine 320, which is as described in conjunction with FIG. 3B. Further, one or more items of information may be stored in a database that may be part of, or in communication with, the analysis tools component 216. For example, information may be stored in a norms database 308.

The dialog analysis module 300 may analyze or compare one or more dialogs. The dialog analysis module 300 can receive supervisor selections 304 of one or more dialogs in the heuristic rules and dialogs database 218. Thus, the supervisor can select past dialogs past that have been successful for agents with respect to a particular problem. In other instances, the dialog analysis module 300 may automatically identify different dialogs within the database 218 that have been successful. For example, an instance of a dialog that has been successful may have an identifier which allows the dialog analysis module 300 to identify the successful dialogs and extract those from the database 218. These successful dialogs may be then matched for norms.

A norm can be a type of language used, a word used, timing for different steps, an order of steps used, or any other type of information about the dialog. If the successful dialogs have similarities between them, those similarities may be stored as norms in the norms database 308. Thus, the dialog analysis module 300 can determine a set of information to which indicates a dialog has been successful and then can store that information in norms database 308. The norms information and any successful dialogs may then be passed to the agent dialog analysis engine 312.

The agent dialog analysis engine 312 can receive an active dialog 316. An active dialog 316 is a dialog that is currently being used by an agent to answer a question or address a customer contact. These active dialogs 316 may be compared in real time to any of the norms information in 308 or to any successful dialog received by the dialog analysis module 300. Based on this comparison, the agent dialog analysis engine 312 can determine if the active dialog 316 is likely to lead to success. Here, if the active dialog 316 is not following norms or successful paths identified in past successful dialog(s), the agent dialog analysis engine 312 can determine that the active dialog 316 is deviating from a successful path. This deviation may be quantified and any response required may be triggered by a message sent to the agent dialog response engine 320.

Figure 3B:
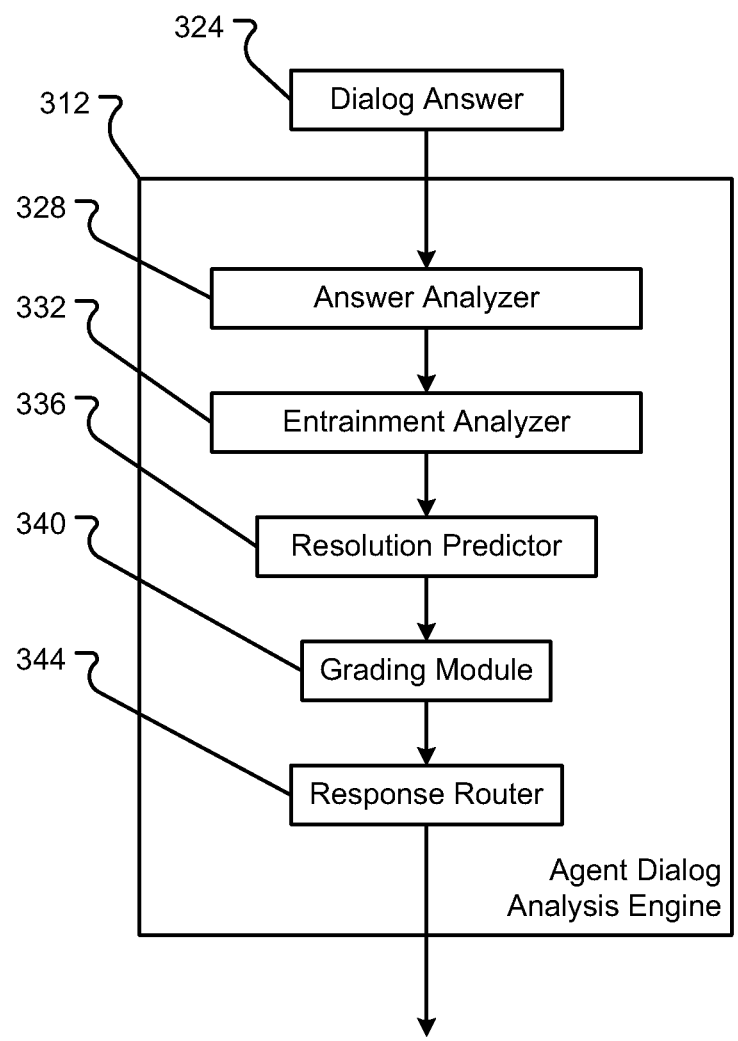
FIG. 3B is a block diagram of an embodiment of an agent dialog analysis engine.

An embodiment of an agent dialog analysis engine 312, is shown in FIG. 3B. The dialog answer 324, from an active dialog 316, may be provided to the agent dialog analysis engine 312. The dialog answer 324 may be a portion or a part of the active dialog 316. The dialog answer 324 may be first reviewed or analyzed by an answer analyzer 328. The answer analyzer 328 can do a comparison to one or more of the norms or to successful past dialogs. The answer analyzer 328 then can pass the dialog answer 324 to an entrainment analyzer 332. The answer analyzer 328 determines if the time elapsed in the active position of the active dialog 316 is within normal parameters as indicated in norms 308. The answer analyzer 328 can also determine if a phrase used was also successful in those paths or an order of steps currently used in the active dialog 316 has been successful in the past.

The entrainment analyzer 332 can evaluate whether the words or word used within the dialog answer 324 compares to one or more of the norms. For example, the entrainment analyzer 332 may utilize synonym analysis or other types of text processing techniques. The entrainment analyzer 332 may analyze the one or more words used in the dialog answer 324. Thus, between the answer analyzer 328 and the entrainment analyzer 332, the dialog answer 324 can be compared, using several different parameters, against the different norms 308 and any past successful dialogs. The information from the analysis is passed to the resolution predictor 336.

The resolution predictor 336 can determine the resolution state of the current dialog answer 324 and/or active dialog 316. A resolution state is a probability that the current active dialog 316 may resolve itself to a successful conclusion. This determination may be completed through language analysis, some other information, and/or include information provided by the answer analyzer 328 and/or the entrainment analyzer 332.

The chance of resolution or predictor of resolution state may then be provided to the grading module 340, which then can quantify through weights, probabilities, and other statistical analysis whether or not the possibility of deviation from a successful path is great enough to warrant a response. The grading module 340 may determine and/or indicate that the deviation is greater or over a predetermined threshold. For example, the grading module 340 may determine that the likelihood of an unsuccessful completion is at a confidence interval of 75% and, if so, send an indication of unsuccessful completion to a response router 344. The response router 344 can then send a signal to the agent dialog response engine 320 to resolve the issue with the deviating dialog.

Figure 3C:
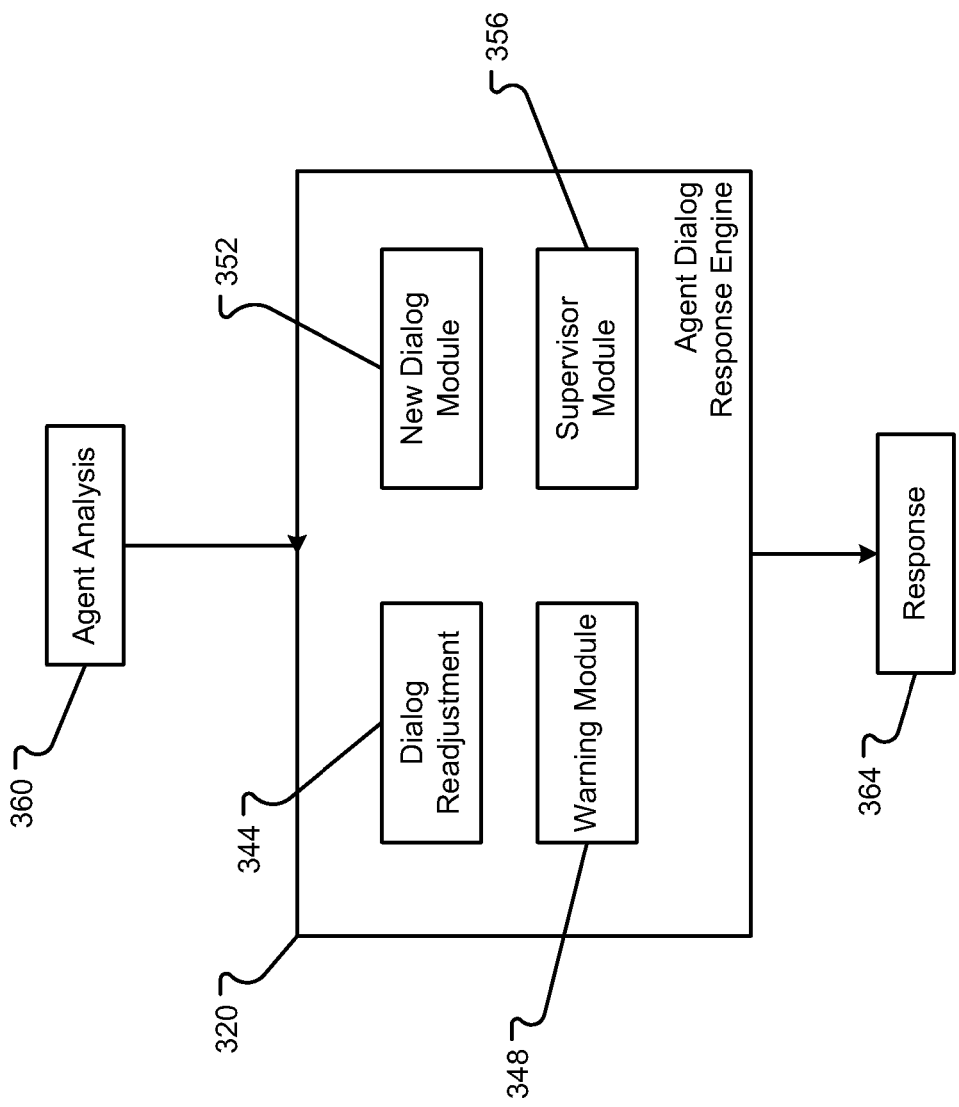
FIG. 3C is a block diagram of an embodiment of an agent dialog response engine.

An embodiment of the agent dialog response engine 320 is shown in FIG. 3C. An agent dialog response engine 320 can receive agent analysis 360 from the analysis tools component 216. The agent dialog response engine 320 may then provide an output, such as a response to the deviating dialog, shown in response 364. This response 364 may be some indication to involve a supervisor, provide an adjustment to the dialog to get the agent back on a successful path, or a determination that a new dialog or some other change is required.

The agent dialog response engine 320 can include one or more sub-modules or components. For example, the agent dialog response engine 320 can include one or more of, but is not limited to, a warning module 348, a dialog readjustment module 344, a new dialog module 352, and/or a supervisor module 356. Based on the agent analysis 360, one of these modules may be activated to provide the response 364. The dialog readjustment module 344 can be used when the agent dialog response engine 320 has deemed that the current contact may be changed and returned to a successful path. In such a case, the dialog readjustment module 344 may send a series of steps to the agent 228 to return them to a successful path of interaction with the customer. These steps may include returning to a previous step in the dialog, repeating a step, changing to a different dialog, etc. These steps may be provided automatically in the agent interface 224.

A warning module 348 may provide a warning to the agent that they are deviating from a successful path. This warning 348 may be some sort of indicia, whether visual or audible, that the user has deviated from a possible successful path of completion in the custom interaction. The warning 348 allows the agent to readjust their interaction and return to a more successful path for completing the interaction with the customer.

A new dialog module 352 can determine that the interaction has deviated in a way that a new dialog may need to be created. In this situation, the new dialog module 352 can signal that this interaction is unique or requires further evaluation and that information is then used in the future to create a new dialog. Any information about the deviation may be provided to a dialog creator 220 to create the new dialog.

The supervisor module 356 can create a warning and attach any other information to send to a supervisor station. Thus, the supervisor module 356 can include the analysis 360, the active dialog 316, and any other information required by the supervisor to evaluate and react to the situation with the customer interaction. The interaction or resolution may be sent as a response 364 to a supervisor device 124, agent device 120, or other systems within the contact center server 116.

Figure 4:
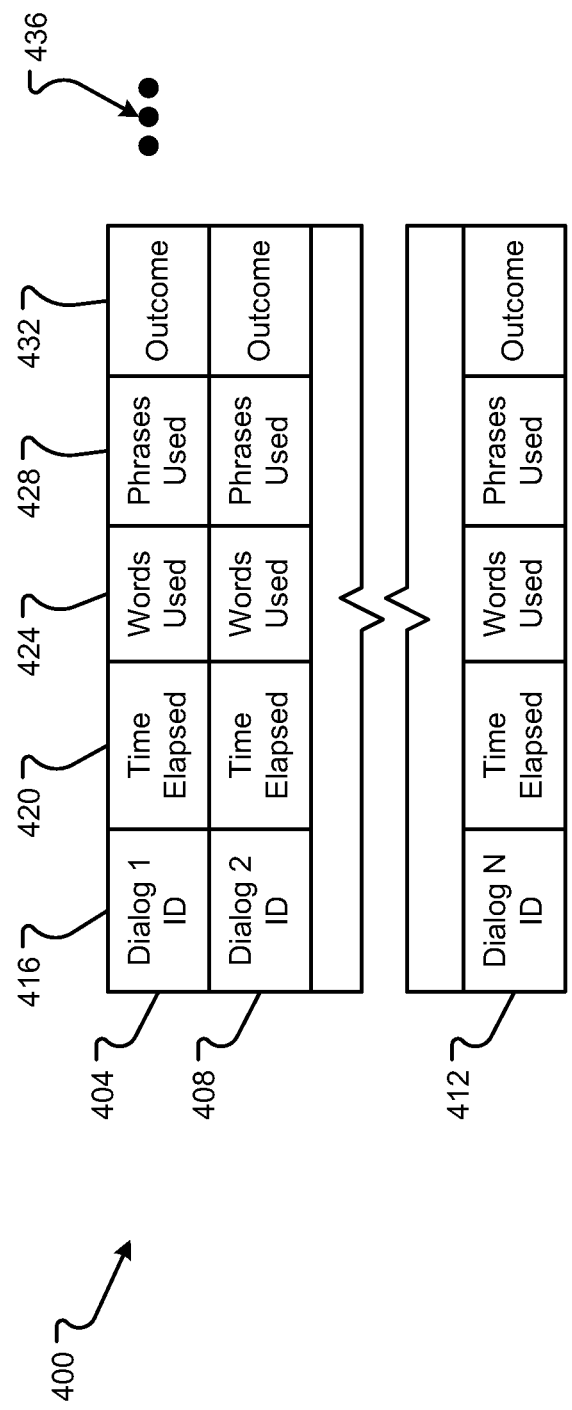
FIG. 4 is a block diagram of an embodiment of an dialog norms data structure.

An embodiment of a database 400 for storing norms associated with one or more dialogs is shown in FIG. 4. There may be several dialogs shown in rows 404 through 412. This information about the dialogs can be stored as a flat file database, a relation database, an object-oriented database, or some other type of database. Each dialog may then be associated with one or more different items of information that are shown in fields, using any number of database storage techniques. For example, each row in the database shown in FIG. 4 has a field for dialog identifier 416, a time elapsed field 420, a words used field 424, phrases used field 428, and/or an outcome field 432. There may be more or fewer fields than those shown in FIG. 4, as represented by ellipses 436.

The dialog identifier 416 can include any type of identifier that uniquely identifies that dialog amongst other dialogs listed in the database 400. The dialog identifier 416 can be an alphanumeric identifier, a globally unique identifier (GUID), or some other type of identifier. The dialog identifier 416 may identify the dialog or a portion of the dialog to which the statistical information or norms pertain.

The time elapsed field 420 can include an average time used for that dialog or portion of the dialog. The time elapsed field 420 can be used to determine that the agent is spending too long on a certain portion of the dialog.

The words used field 424 can include the norms of language that are used for the dialog or the section of the dialog. The words used field 424 may also be extrapolated for known synonyms or other language that may be similar to the words used in past dialogs. Thus, the words used field 424 can include several different words, whether those words are used in a past dialog or may be similar to them.

A phrase used field 428 can include any phrases that were used in past dialogs. The phrase used field 428 may also include similar phrases within the field 428. Between the words used field 424 and the phrases used field 428, language for the dialog, or past dialogs, may be stored such that if there are deviations, the deviations may be indicated in active dialogs.

An outcome field 432 may include the type of outcome for the dialog. For past dialogs, the outcome 432 is likely to be successful. However, unsuccessful dialogs may also be provided in database 400 to determine if the active dialog is similar to the unsuccessful dialog. Thus, the outcome field 432 may also include outcomes that were not successful. In this way, past dialogs may indicate not only a deviation from a successful path but a similarity to an unsuccessful path.

An embodiment of a method 500 for establishing norms with past dialogs is shown in FIG. 5. While a general order for the steps of the method 500 is shown in FIG. 5, the method 5 can include more or fewer steps, and the steps may be arranged in a different order than shown in FIG. 5. Generally, the method 500 starts with a start operation 504 and ends with an end operation 532. The method 500 can include more or fewer steps or can arrange the order of the steps differently than those shown in FIG. 5. The method 500 can be executed as a set of computer-executable instructions, executed by a computer system, and encoded or stored on a computer readable medium. Further, the method 500 can be executed by a gate or other hardware device or component in an Application Specific Integrated Circuit, a Field Programmable Gate Array, or other type of hardware device. Hereinafter, the method 500 shall be explained with reference to the systems, components, modules, software, data structures, user interfaces, etc. described herein.

The dialog analysis module 300 can receive a dialog choice(s) from the supervisor, in step 508. The supervisor selections 304 may be made in a user interface that is associated with a dialog and may be received by the dialog analysis module 300. These selections may indicate which past dialogs in the database 218 are to be reviewed and compared for norms.

The dialog analysis module 300 may then access the dialogs database 218 to retrieve past dialogs, in step 512. The retrieved past dialogs can be as selected by the supervisor in the supervisor selection 304. Further, the dialog analysis module 300 may access all dialogs of a similar type that were successful in the past. Thus, the heuristic rules and dialogs database 218 can include an indication of the outcome of the dialog such as that stored in field 432. Here, the dialog analysis module 300 may retrieve any dialog or a dialog of a certain ID 416 with an outcome 432 that is successful. Still further, the dialog analysis module 300 may also retrieve dialogs with the dialog 416 with an unsuccessful outcome 432. These dialogs may then be used for comparison purposes.

The dialog analysis module 300 may then map the dialogs for norms, in step 516. Here, the dialogs that are successful may be compared for similar words used and similar phrases used that can be stored in fields 424, 428. Further, the amount of time elapsed for successful portions for the dialog may be stored in field 420. These norms 308 provide for an average or common equivalence for successful dialogs. The norms may also include any kind of normal or abnormal behavior for unsuccessful dialogs. This information may also be stored. Thus, the dialog analysis module 300 can establish the norms for successful and unsuccessful dialogs, in step 520. These norms may then be stored in the norms database 308.

At some time thereinafter, an active dialog 316 may be reviewed by the agent dialog analysis engine 312. The agent dialog analysis engine 312 may request the norms and/or successful databases related to the active dialog 316. The dialog analysis module 300 can retrieve the norms from the norms database 308 and successful dialogs from the dialog database 218 and provide those norms for analysis, in step 524. The successful dialogs may be provided for analysis, in step 528.

An embodiment of a method 600 for reviewing an active dialog 316 is shown in FIG. 6. While a general order for the steps of the method 600 is shown in FIG. 6, the method 6 can include more or fewer steps, and the steps may be arranged in a different order than shown in FIG. 6. Generally, the method 600 starts with a start operation 604 and ends with an end operation 640. The method 600 can include more or fewer steps or can arrange the order of the steps differently than those shown in FIG. 6. The method 600 can be executed as a set of computer-executable instructions, executed by a computer system, and encoded or stored on a computer readable medium. Further, the method 600 can be executed by a gate or other hardware device or component in an Application Specific Integrated Circuit, a Field Programmable Gate Array, or other type of hardware device. Hereinafter, the method 600 shall be explained with reference to the systems, components, modules, software, data structures, user interfaces, etc. described herein.

Here, the agent dialog analysis engine 312 can receive norms for the dialog analysis module 300, in step 608. The agent dialog analysis engine 312 can request the norms from the dialog analysis module 300. In response, the dialog analysis module 300 can retrieve the norms from the norms database 308 and send the norms back to the agent dialog analysis engine 312.

The agent dialog analysis engine 312 can also request one or more successful and/or unsuccessful dialogs from the dialog analysis module 300. The dialog analysis module 300 can retrieve the requested dialog(s) from the dialog database 218 and forward those dialog(s) to the dialog analysis engine 312. The agent dialog analysis engine 312 can receive the dialogs, in step 612.

The norms and successful and/or unsuccessful dialogs may now be compared to the active dialog 316 by the agent dialog analysis engine 312, in step 616. The answer analyzer 328 may compare the time elapsed for a question, any phrases used may be analyzed, or other information may be analyzed with respect to the norms and/or in the comparison to a successful (or unsuccessful) dialog. The entrainment analyzer 332 may also compare the words used in any kind of dialog answer 324 in the active dialog 316 to norms or other dialogs. This information may then be provided to the resolution predictor 336.

The agent dialog analysis engine 312 can also determine a degree of deviation for the active dialog 316. Thus, the decision of whether the active dialog 316 will or will not be successful may not be binary but a level of separation from past successful paths. To determine the degree of deviation, the agent dialog analysis engine 312 may evaluate the current agent's skill and/or /experience level, the intent of the dialog, the quality of the model dialogs used in any comparison, etc. Some agents may be allowed more deviation than other agents. For example, new agents may not be allowed to deviate far from a past successful path; but, for an experienced agent with a high success rate and on a topic where there are few past dialogs to use in the comparison, the experienced agent may be allowed to deviate much farther from a successful path. This flexibility provides the advantage of discovering new successful dialogs created when a path deviates from past dialogs. Thus, the agent dialog analysis engine 312 can provide the resolution predictor a degree of deviation, which may be any metric, as known in the art, to calculate such a separation.

The resolution predictor 336 can determine the intent and/or possible resolution state, in step 620. Here, the resolution predictor 336 may, based on the analysis, determine the correlation between the active dialog 316 and one or more successful/unsuccessful dialogs. Further, the resolution predictor 336 may determine a correlation between the time elapsed, words used, and phrases used, in fields 420 through 428, to the active dialog 316. This analysis may provide a correlation between the norms and the active dialog 316. Further still, the resolution predictor 336 can compare the active dialog 316 to unsuccessful dialogs to determine a correlation to an unsuccessful outcome. Further, there is also an agent component to the resolution predictor. Agents that have been highly successful in the past may be more likely to be successful with a dialog that deviates from a past known and successful dialog. The skilled agent may also have a better success rate that a lower-skilled agent even when in the same dialog state. Thus, agent experience and skill may also effect the resolution prediction. This information may then be used to determine the likelihood that a resolution may be needed for the active dialog 316. The resolution state may then be provided to the grading module 340.

The grading module 340 may then quantify the deviation from success, in step 624. The grading module may provide weights or measures of the comparisons between words, phrases, times, or other information used in the analysis. The grading module 340 may also provide weights or measures to the resolution state and intent provided by the resolution predictor 336. This information quantifies whether or not the current active dialog 316 appears to be on course to a successful resolution. If there is a deviation, that amount of deviation may be quantified by an algorithm measuring the different analysis as understood in the art.

The information from the grading module 340 is presented to the response router 344, which determines if a problem with the current active dialog needs to be addressed, in step 628. Here, the response router 344 receives a deviation from a successful outcome and the degree of that deviation. If the degree of deviation is slight, or if there is no deviation, the method 600 proceeds NO back to step 616 to continue to analyze the active dialog as the dialog continues. However, if there is a deviation and that deviation needs addressing, the method 600 proceeds YES to step 632.

In another situation, the grading module 340 may capture words and/or phrases that are outside of the normative response. For example, the agent may instruct a customer to power cycle a faulty modem. The customer may reply that they have power cycled the modem, which is the correct action, and that there is a lot of dust on the modem, which is extra information. The extra information may not be relevant at the current point in the dialog but can be important at some point thereinafter. For example, dust related failures may only account for 2% of all modem issues, Thus, the grading module 340 would not assume that dust is a problem. However, as the number of dialog turns increases, the probability of the dust being the issue increases as the issues having a higher likelihood of being the root cause are dismissed.

With this example, the dust issue is a known factor but is a possible cause with a low probability. Thus, the dust may not be an unknown factor. The customer's statement about the power cycling the modem and the dust may be both a statement that contains both dialog satisfying text and text that is outside of what is expected at that point. The grading module 340 may capture the text that is outside of the dialog as dialog state information that might influence future dialog turns or be a determinate in why a dialog might not be reaching success. Thus, the grading module 340 may differentiate components of the response that contribute to the grading because they are known concepts/words/phrases that fit in the current dialog state and other components of the response that might deviate (unknown or improbable words) from the current state. The grading module 340 may store the deviations for future reference in the grading of subsequent states. For example, after three more dialog turns, the word "dust", which was captured earlier, could influence the grading of the current response to select a different dialog path. If the response includes expected content and unexpected content, and the expected content satisfies the threshold for advancing the dialog, then the unexpected content could be stored for possible future use. If the dialog proceeds to success, then the unexpected content can be discarded. If the dialog fails to reach success, then the agent can be prompted to ask about the unexpected content.

In step 632, the response router 344 sends a signal to the agent dialog response engine 320 that a response is needed. The agent dialog response engine 320 then determines a resolution to the problem, in step 632. Here, the agent analysis 360 is processed by the dialog readjustment module 344, the warning module 348, the new dialog module 352, and/or the supervisor module 356. Based on the degree of deviation, or the seriousness of the problem, one of the modules 344 through 356 determines a resolution to the problem. This response then is sent in packet 364. The response can be a warning to the agent, a warning to the supervisor, a dialog readjustment, and/or a new dialog request. One of these responses may be enacted by the contact center server 116, in step 636. Thus, if the warning module is sent to an agent, the agent 228 may enact a resolution by reacting to the warning. Similarly, the dialog readjustment 344 may be performed by the agent to readjust the dialog. The signal to the supervisor may be sent to a supervisor's device 124 allowing the supervisor 126 to respond to the issue.

Finally, if a new dialog is requested, that information may be sent to the dialog creator 220 to create a new dialog in database 218. For example, if a deviation from past dialogs is successful, the deviating dialog may be used to create a new dialog for agents in the future. Thus, the reaction to a deviation can be to create a newly successful dialog by learning the parameters that made the dialog successful and incorporating those parameters into a new dialog.

Figure 7:
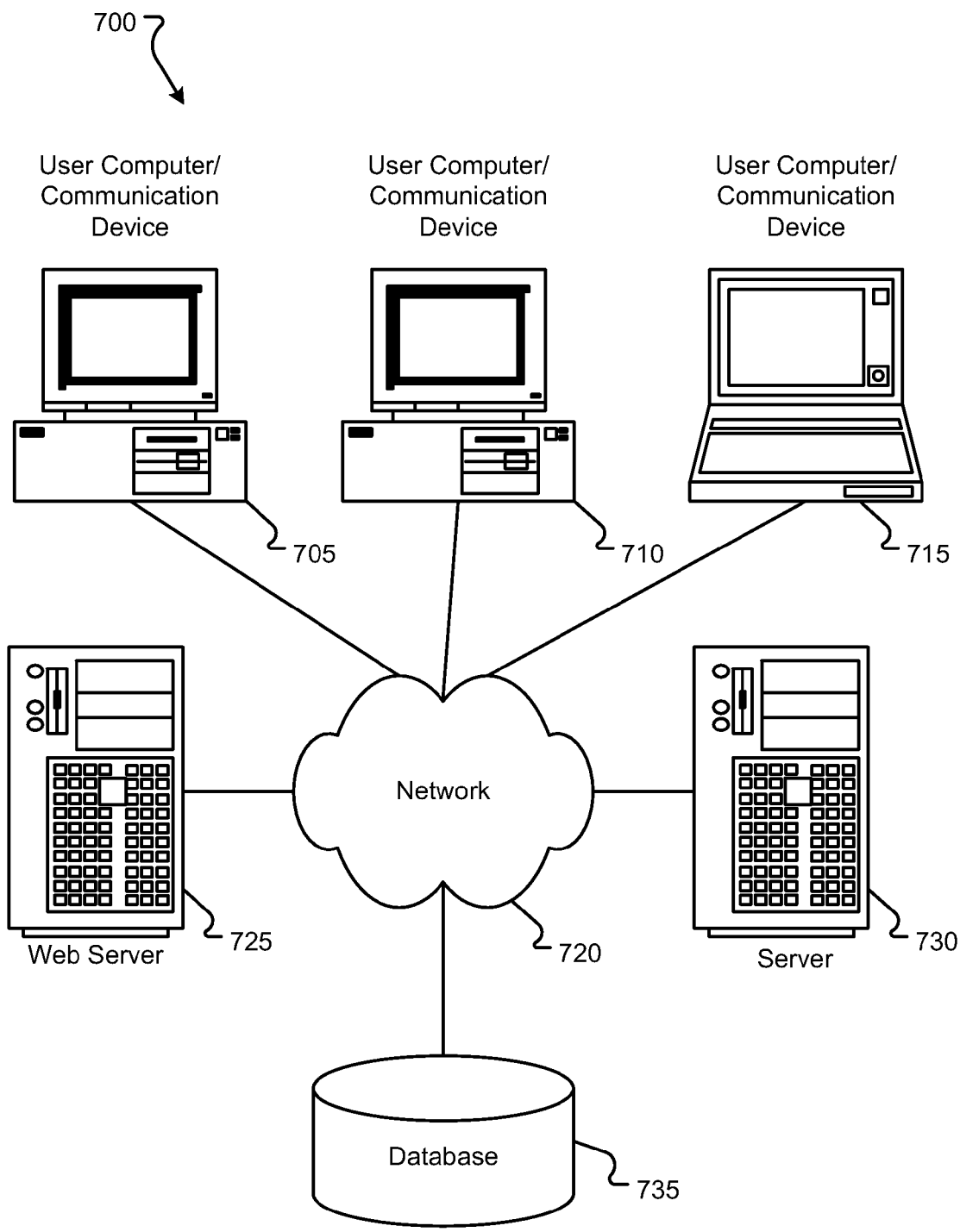
FIG. 7 is a block diagram of an embodiment of a computing environment.

FIG. 7 illustrates a block diagram of a computing environment 700 that may function as servers, computers, or other systems provided herein. The environment 700 includes one or more user computers 705, 710, and 715. The user computers 705, 710, and 715 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network 720 and/or displaying and navigating web pages or other types of electronic documents. Although the exemplary computer environment 700 is shown with three user computers, any number of user computers may be supported.

Environment 700 further includes a network 720. The network 720 may can be any type of network familiar to those skilled in the art that can support data communications using any of a variety of commercially-available protocols, including without limitation SIP, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server 725, 730. In this example, server 725 is shown as a web server and server 730 is shown as an application server. The web server 725, which may be used to process requests for web pages or other electronic documents from user computers 705, 710, and 715. The web server 725 can be running an operating system including any of those discussed above, as well as any commercially-available server operating systems. The web server 725 can also run a variety of server applications, including SIP servers, HTTP servers, FTP servers, CGI servers, database servers, Java servers, and the like. In some instances, the web server 725 may publish operations available operations as one or more web services.

The environment 700 may also include one or more file and or/application servers 730, which can, in addition to an operating system, include one or more applications accessible by a client running on one or more of the user computers 705, 710, 715. The server(s) 730 and/or 725 may be one or more general purpose computers capable of executing programs or scripts in response to the user computers 705, 710 and 715. As one example, the server 730, 725 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the server 725 and/or 730 may be forwarded to a user computer 705 via a web (file) server 725, 730. Similarly, the web server 725 may be able to receive web page requests, web services invocations, and/or input data from a user computer 705 and can forward the web page requests and/or input data to the web (application) server 730. In further embodiments, the web server 730 may function as a file server. Although for ease of description, FIG. 6 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, web (file) server 725 and/or web (application) server 730 may function as the system, devices, or components described in FIGS. 1-4.

The environment 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. The database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. The database 735 may be a relational database, such as Oracle 10i™, that is adapted to store, update, and retrieve data in response to SQL-formatted commands.

Figure 8:
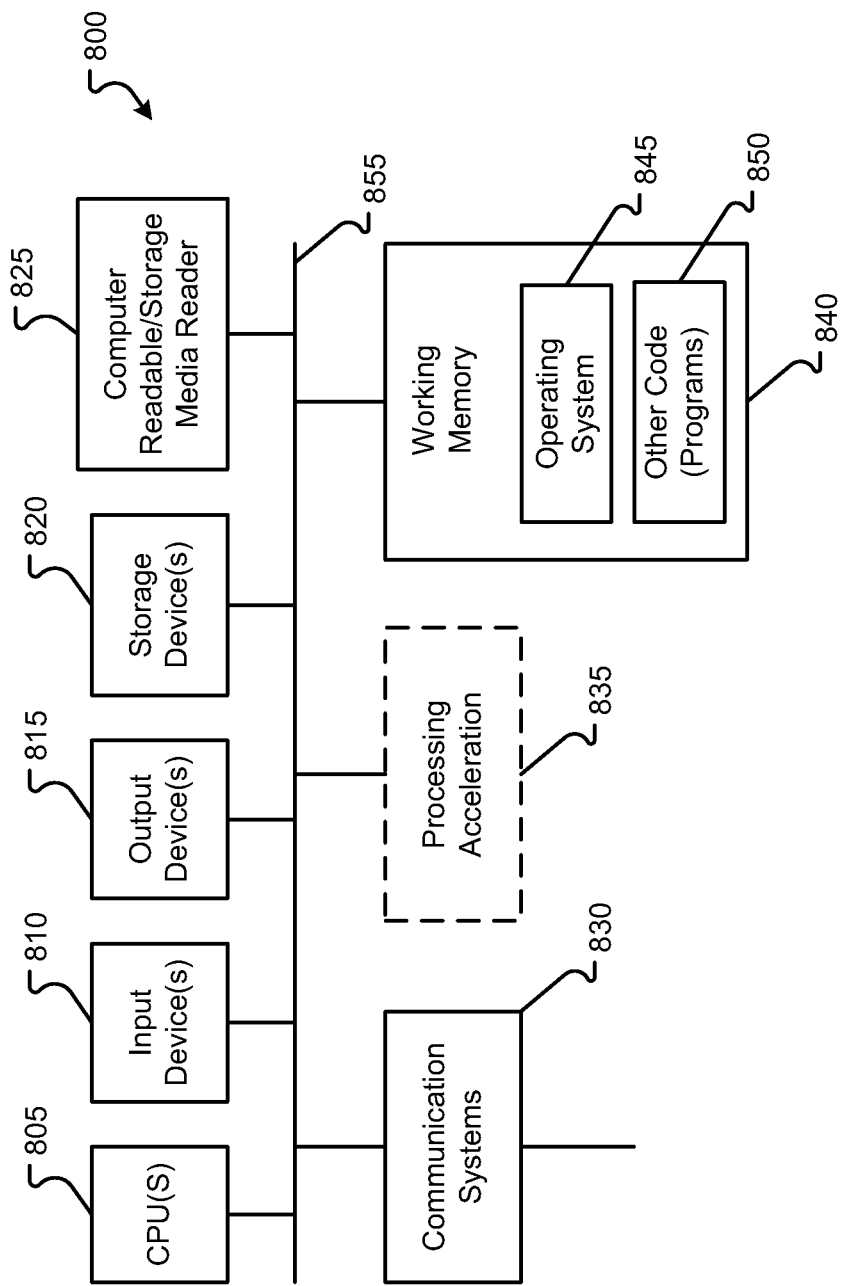
FIG. 8 is a block diagram of an embodiment of a computer system.

FIG. 8 illustrates one embodiment of a computer system 800 upon which the servers, computers, or other systems or components described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage devices 820. By way of example, storage device(s) 820 may be disk drives, optical storage devices, solid-state storage devices such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. The computer system 800 may also include a processing acceleration unit 835, which can include a DSP, a special-purpose processor, and/or the like.

The computer-readable storage media reader 825 can further be connected to a computer-readable storage medium, together (and, optionally, in combination with storage device(s) 820) comprehensively representing remote, local, fixed, and/or removable storage devices plus storage media for temporarily and/or more permanently containing computer-readable information. The communications system 830 may permit data to be exchanged with the network 720 (FIG. 7) and/or any other computer described above with respect to the computer system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the Fig. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for analyzing an agent dialog in a contact center, the method comprising:
   receiving, by a processor, a contact from a customer;
   starting an active dialog with the customer;
   receiving one or more norms for the active dialog or a successful past dialog associated with the active dialog, the one or more norms being based on an analysis of dialogs between multiple agents and multiple customers;
   comparing the active dialog with the one or more of the norms or the successful past dialog;
   based on the comparison, determining if the active dialog is deviating from a successful path;
   if the active dialog is not deviating from the successful path, continuing comparing the active dialog with the one or more of the norms or the successful past dialog until the contact is terminated;
   if the active dialog is deviating from a successful path, determining a resolution; and
   enacting the resolution.

2. The method as defined in claim 1, wherein the active dialog has two or more successful paths, and wherein the dialogs comprise multiple media types comprising a plurality of email, instant messaging, telephone call, short message system, and social media messages.

3. The method as defined in claim 2, further comprising:
receiving dialog choices from a supervisor;
retrieving past dialogs associated with the choices;
mapping dialogs for norms;
establishing the norms for each dialog;
providing the norms for analysis; and
providing successful dialogs for analysis.

4. The method as defined in claim 3, further comprising: determining intent of the active dialog.

5. The method as defined in claim 4, further comprising: determining a resolution state associated with the active dialog.

6. The method as defined in claim 5, further comprising: quantifying the deviation from a successful path based on one or more of the comparison, the intent of the active dialog, or the resolution state.

7. The method as defined in claim 5, wherein the resolution state is one or a probability that the active dialog will end in a successful conclusion or a degree of deviation from a successful dialog path.

8. The method as defined in claim 7, wherein the comparison to the norms can include one or more of:
determining if a time elapsed is within normal parameters;
determining if a word used has been successful;
determining if a phrase used has been successful; and
determining if an order of steps in the active dialog has been successful.

9. The method as defined in claim 8, further comprising one or more of:
determining if a new dialog is required to address the contact;
determining if a new sequence of steps is successful; and
determining if a dialog variation is successful.

10. The method as defined in claim 9, wherein the resolution is one or more of:
a warning to an agent that the agent is no longer on a successful path;
an adjustment to the active dialog to return the agent to a successful path;
an alert to a supervisor that the agent is no longer on a successful path; and
a creation of a new dialog based on the successful dialog variation.

11. A non-transient and tangible computer readable medium having stored thereon processor executable instructions that cause a computing system to execute a method for analyzing an agent dialog, the instructions comprising:
instructions to receive dialog choices from a supervisor;
instructions to retrieve past dialogs associated with the choices;
instructions to map dialogs for norms, the dialogs involving multiple agents and multiple customers;
instructions to establish the norms for each dialog;
instructions to provide the norms for analysis;
instructions to provide successful dialogs for analysis;
instructions to receive, by a processor, a contact from a customer;
instructions to start an active dialog with the customer;
instructions to receive one or more norms for the active dialog or a successful past dialog associated with the active dialog;
instructions to compare the active dialog with the one or more of the norms or the successful past dialog;
based on the comparison, instructions to determine if the active dialog is deviating from a successful path;
if the active dialog is not deviating from the successful path, instructions to continue to compare the active dialog with the one or more of the norms or the successful past dialog until the contact is terminated;
if the active dialog is deviating from a successful path, instructions to determine a resolution; and
instructions to enact the resolution.

12. The computer readable medium as defined in claim 11, wherein the active dialog has two or more successful paths, and wherein the dialogs comprise multiple media types comprising a plurality of email, instant messaging, telephone call, short message system, and social media messages.

13. The computer readable medium as defined in claim 12, further comprising:
instructions to determine intent of the active dialog; and
instructions to determine a resolution state associated with the active dialog, wherein the resolution state is one or more of a probability that the active dialog will end in a successful conclusion and a degree of deviation from a successful dialog path.

14. The computer readable medium as defined in claim 13, further comprising:
instructions to quantify the deviation from a successful path based on one or more of the comparison, the intent of the active dialog, or the resolution state; and
wherein the comparison to the norms can include one or more of:
instructions to determine if a time elapsed is within normal parameters;
instructions to determine if a word used has been successful;
instructions to determine if a phrase used has been successful; and
instructions to determine if an order of steps in the active dialog has been successful.

15. The computer readable medium as defined in claim 14, further comprising one or more of:
instructions to determine if a new dialog is required to address the contact;
instructions to determine if a new sequence of steps is successful;
instructions to determine if a dialog variation is successful;
wherein the resolution is one or more of:
a warning to an agent that the agent is no longer on a successful path;
an adjustment to the active dialog to return the agent to a successful path; and
an alert to a supervisor that the agent is no longer on a successful path.

16. A communication system comprising:
a contact center server in communication with one or more agents, the contact center server operable to receive a customer contact, from a customer, wherein the contact center server comprises a dialog system, the dialog system operable to analyze an active dialog associated with the customer contact, wherein the dialog system compromises:
an analysis tools component that is operable to receive and analyze the active dialog, wherein the analysis tools component compromises:
a dialog analysis module operable to:
receive dialog choices from a supervisor;
retrieve past dialogs associated with the choices;

map dialogs for norms;
establish the norms for each dialog;
provide the norms for analysis;
provide successful dialogs for analysis, the successful dialogs involving multiple agents and multiple customers;
an agent dialog analysis engine in communication with the dialog analysis module, wherein the agent dialog analysis engine is operable to:
receive, by a processor, a contact from a customer;
start an active dialog with the customer;
receive one or more of norms for the active dialog or a successful past dialog associated with the active dialog;
compare the active dialog with the one or more of the norms or the successful past dialog;
based on the comparison, determine if the active dialog is deviating from a successful path;
if the active dialog is not deviating from the successful path, continue compare the active dialog with the one or more of the norms or the successful past dialog until the contact is terminated;
if the active dialog is deviating from a successful path, provide the active dialog for resolution determination.

17. The communication system as defined in claim 16, wherein the agent dialog analysis engine comprises:
an answer analyzer operable to determine one or more of:
if a time elapsed is within normal parameters;
if a phrase used has been successful;
if an order of steps in the active dialog has been successful;
an entrainment analyzer operable to determine one or more of a word used in the active dialog has been successful or an intent of the active dialog-;
a resolution predictor operable to determine a resolution state associated with the active dialog, wherein the resolution state is a probability that the active dialog will end in a successful conclusion;
a grading module operable to quantify the deviation from a successful path based on one or more of the comparison, the intent of the active dialog, or the resolution state; and
a response router operable to determine a resolution is required.

18. The communication system as defined in claim 17, wherein the response router sends a signal to an agent dialog response engine to determine a resolution, wherein the agent dialog response engine comprises:
a dialog readjustment module operable to: enforce an adjustment to the active dialog to return the agent to a successful path;
a warning module operable to send a warning to an agent that the agent is no longer on a successful path;
a new dialog module operable to one or more of:
determine if a new dialog is required to address the contact;
determine if a new sequence of steps is successful;
determine if a dialog variation is successful; and
a supervisor module operable to send an alert to a supervisor that the agent is no longer on a successful path.

19. The communication system as defined in claim 18, wherein the answer analyzer is further operable to access a database including norms, the norms including one or more of:
a time elapsed for at least a portion of past dialogs associated with the active dialog;
a word used in a past successful dialog; and
a phrased used in a past successful dialog.

20. The communication system as defined in claim 19, wherein the active dialog has two or more successful paths, and wherein the dialogs comprise multiple media types comprising a plurality of email, instant messaging, telephone call, short message system, and social media messages.

* * * * *